United States Patent
Kim et al.

(10) Patent No.: US 11,032,853 B2
(45) Date of Patent: Jun. 8, 2021

(54) METHOD FOR PERFORMING RANDOM ACCESS PROCESS AND DEVICE THEREFOR

(71) Applicant: LG Electronics Inc., Seoul (KR)

(72) Inventors: Jaehyung Kim, Seoul (KR); Joonkui Ahn, Seoul (KR); Seokmin Shin, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 16/610,610

(22) PCT Filed: May 4, 2018

(86) PCT No.: PCT/KR2018/005172
§ 371 (c)(1),
(2) Date: Nov. 4, 2019

(87) PCT Pub. No.: WO2018/203696
PCT Pub. Date: Nov. 8, 2018

(65) Prior Publication Data
US 2020/0068620 A1    Feb. 27, 2020

Related U.S. Application Data

(60) Provisional application No. 62/501,176, filed on May 4, 2017, provisional application No. 62/542,803, filed on Aug. 9, 2017.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0053* (2013.01); *H04W 72/042* (2013.01); *H04W 72/0446* (2013.01); *H04W 74/006* (2013.01)

(58) Field of Classification Search
None
See application file for complete search history.

(56) References Cited

U.S. PATENT DOCUMENTS 10,798,734 B2 * 10/2020 Reddy ............... H04W 74/0833
2016/0198497 A1   7/2016 Yu et al.
(Continued)

FOREIGN PATENT DOCUMENTS

KR    20100020472    2/2010
KR    20150097754    8/2015
(Continued)

OTHER PUBLICATIONS

PCT International Search Report and Written Opinion in International Application No. PCT/KR2018/005172, dated Aug. 13, 2018, 27 pages (with English translation).
(Continued)

*Primary Examiner* — Brenda H Pham
(74) *Attorney, Agent, or Firm* — Fish & Richardson P.C.

(57) ABSTRACT

The present invention relates to a method for performing a random access process in a wireless communication system, and a device therefor, and relates to a method and a device therefor, the method comprising the steps of: receiving, from a base station, narrowband physical random access channel (NPRACH) configuration information; and repeatedly transmitting an NPRACH preamble on the basis of the received NPRACH configuration information, wherein, if a time gap between a completion time point of the last repeated transmission of the NPRACH preamble and a next subframe is smaller than a guard time, the last repeated transmission of the NPRACH preamble is dropped, or is punctured as much as the difference between the guard time and the time gap in the last repeated transmission of the NPRACH preamble.

15 Claims, 13 Drawing Sheets

(51) Int. Cl.
    *H04W 72/04*     (2009.01)
    *H04W 74/00*     (2009.01)

(56) References Cited

U.S. PATENT DOCUMENTS

| | | | |
|---|---|---|---|
| 2016/0286555 A1 | 9/2016 | Papasakellariou | |
| 2017/0367121 A1* | 12/2017 | Wei | H04W 72/042 |
| 2018/0131547 A1* | 5/2018 | Wang | H04L 5/0094 |
| 2018/0219663 A1* | 8/2018 | Lin | H04W 74/0833 |
| 2019/0068427 A1* | 2/2019 | Hwang | H04L 5/0092 |
| 2019/0075602 A1* | 3/2019 | Lin | H04L 5/0012 |

FOREIGN PATENT DOCUMENTS

| | | |
|---|---|---|
| KR | 20160065139 | 6/2016 |
| KR | 20160132482 | 11/2016 |
| WO | WO2014003339 | 1/2014 |

OTHER PUBLICATIONS

Extended European Search Report in European Appln. No. 18793973.1, dated Dec. 9, 2020, 11 pages.

Ericsson, "Narrowband IoT—Random Access Design," R1-157424, 3GPP TSG-RAN1 #83, Anaheim, United States, Nov. 15-22, 2015, 10 pages.

LG Electronics, "Resource configuration for Nprach range enhancement," R1-1804527, 3GPP RSG RAN WG1 Meeting #92bis, Sanya, China, Apr. 16-20, 2018, 4 pages.

\* cited by examiner

FIG. 8
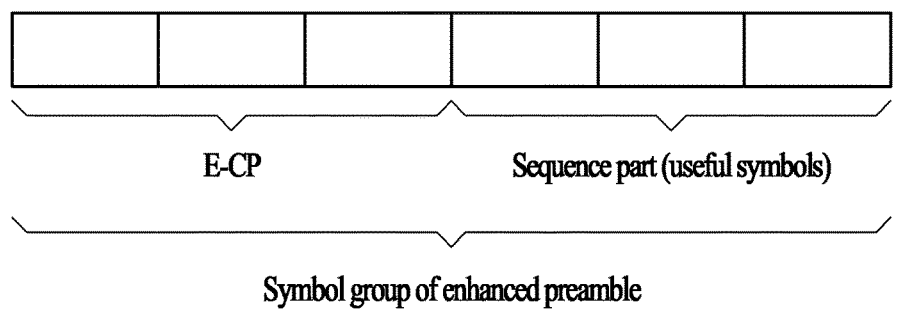
(a)
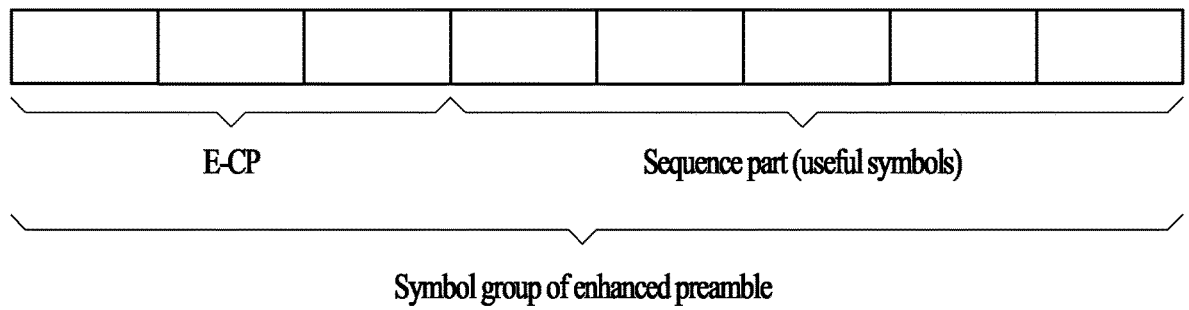
(b)

FIG. 9
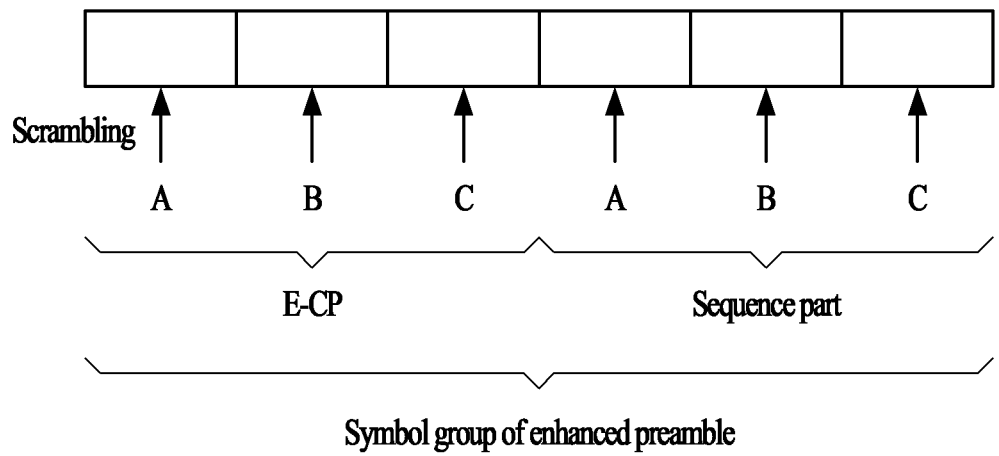
(a)
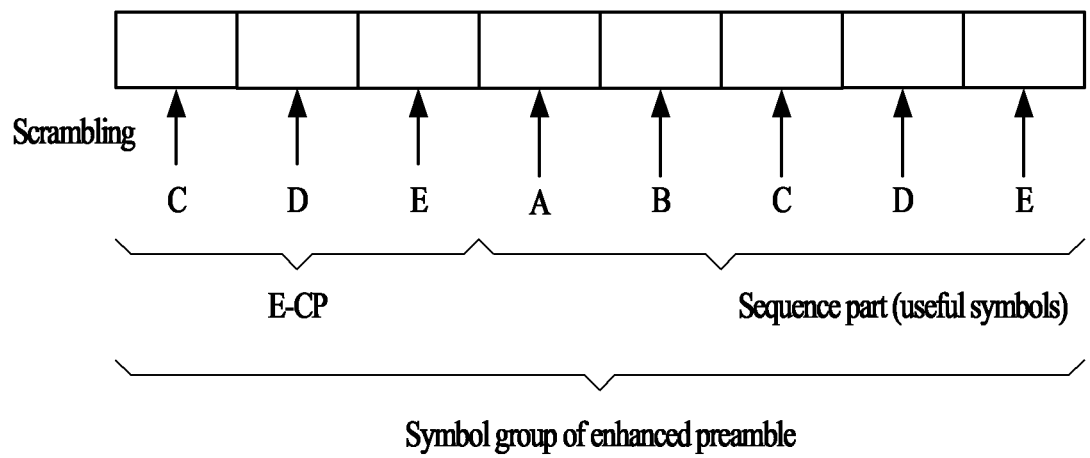
(b)

FIG. 12
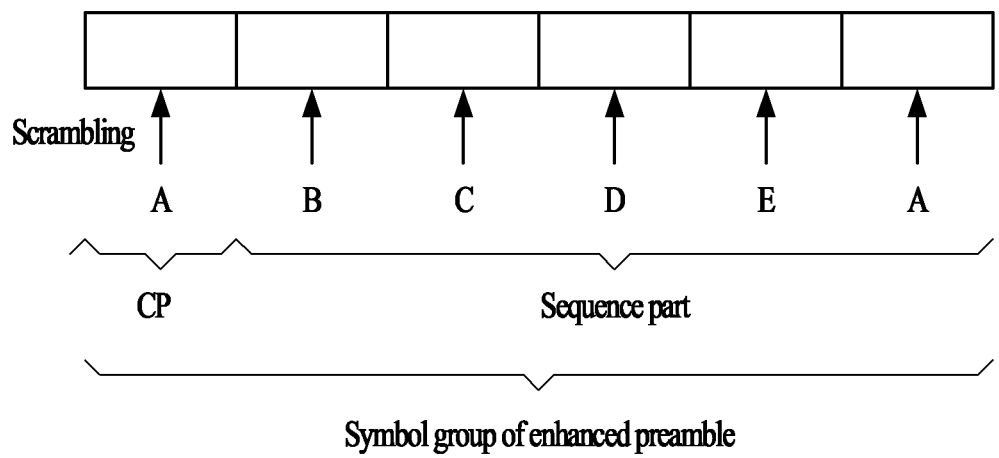
(a)
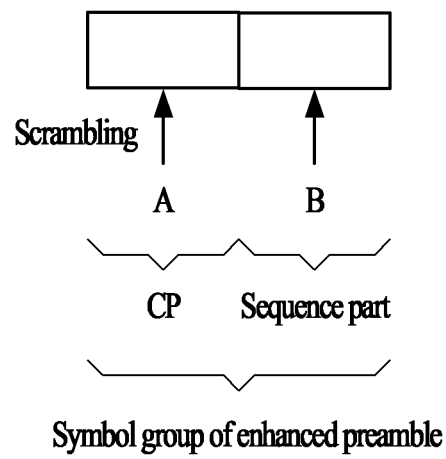
(b)

FIG. 13

| Number of repetition | 1 | 3 | 8 | 13 | 18 | 33 | 63 | 128 |
|---|---|---|---|---|---|---|---|---|
| Preamble length (ms) | 6.4 | 19.2 | 51.2 | 83.2 | 115.2 | 211.2 | 403.2 | 819.2 |
| Time gap (ms) | 0.6 | 0.8 | 0.8 | 0.8 | 0.8 | 0.8 | 0.8 | 0.8 |

(a) Method 4-3-1

| Number of repetition | 1 | 3 | 6 | 8 | 18 | 33 | 63 | 128 |
|---|---|---|---|---|---|---|---|---|
| Preamble length (ms) | 6.4 | 19.2 | 38.4 | 51.2 | 115.2 | 211.2 | 403.2 | 819.2 |
| Time gap (ms) | 0.6 | 0.8 | 0.6 | 0.8 | 0.8 | 0.8 | 0.8 | 0.8 |

(b) Method 4-3-2

METHOD FOR PERFORMING RANDOM ACCESS PROCESS AND DEVICE THEREFOR

CROSS-REFERENCE TO RELATED APPLICATIONS

This application is the National Phase of PCT International Application No. PCT/KR2018/005172, filed on May 4, 2018, which claims the benefit of U.S. Provisional Application Nos. 62/501,176, filed on May 4, 2017 and 62/542,803, filed on Aug. 9, 2017, which are all hereby incorporated by reference herein in their entirety.

TECHNICAL FIELD

The present disclosure relates to a wireless communication system. More specifically, the present disclosure relates to a method of performing a random access procedure for effective coverage enhancement and an apparatus therefor.

BACKGROUND ART

When a new radio access technology (RAT) system is introduced, as more and more communication devices require larger communication capacity, there is a need for improved mobile broadband communication as compared to existing RAT. In addition, massive machine type communications (MTC) connected to a plurality of devices and things to provide various services anytime and anywhere is one of main issues to be considered in next-generation communication. In addition, communication system design considering services/UEs sensitive to reliability and latency has been discussed. As such, considering enhanced mobile broadband communication (eMBB), massive MTC (mMTC), URLLC (Ultra-Reliable Low-Latency Communication), etc, the next generation wireless access technology is being discussed, and such a technology is referred to as new RAT (NR) for convenience.

DISCLOSURE

Technical Problem

An object of the present disclosure is to provide a method for performing a random access procedure for effective range enhancement in a wireless communication system, and a device therefor.

Specifically, an object of the present disclosure is to provide a method and apparatus for performing a random access procedure and/or a structure or format of a random access preamble for effectively transmitting and receiving a random access preamble for narrowband Internet of Things (NB-IoT) communication in a wireless communication system supporting an extended cell radius.

It will be understood by persons skilled in the art that the objects that can be achieved with the present disclosure are not limited to what has been particularly described hereinabove and other objects that the present disclosure can achieve will be more clearly understood from the following detailed description.

Technical Solution

In a first aspect of the present disclosure, provided herein is a method for performing a random access procedure by a user equipment in a wireless communication system, the method comprising: receiving narrowband physical random access channel (NPRACH) configuration information from a base station; and repeatedly transmitting an NPRACH preamble based on the received NPRACH configuration information, wherein, when a time gap between a time of completing a last repeated transmission of the NPRACH preamble and a next subframe is smaller than a guard time, the last repeated transmission of the NPRACH preamble is dropped or is punctured by a difference between the guard time and the time gap in the last repeated transmission of the NPRACH preamble.

In a second aspect of the present disclosure, provided herein is a user equipment for performing a random access procedure in a wireless communication system, comprising: a radio frequency (RF) transceiver; and a processor operatively connected to the RF transceiver, wherein the processor is configured to: receive narrowband physical random access channel (NPRACH) configuration information from a base station, and repeatedly transmit an NPRACH preamble based on the received NPRACH configuration information, wherein, when a time gap between a time of completing a last repeated transmission of the NPRACH preamble and a next subframe is smaller than a guard time, the last repeated transmission of the NPRACH preamble is dropped or is punctured by a difference between the guard time and the time gap in the last repeated transmission of the NPRACH preamble.

Preferably, the guard time may be configured through the NPRACH configuration information.

Preferably, the number of repeated transmissions of the NPRACH preamble may be configured through the NPRACH configuration information.

Preferably, the number of repeated transmissions may be configured to be one of 1, 2, 4, 8, 16, 32, 64, or 128, and when the number of repeated transmissions is one of 1, 2, or 4, the number of repeated transmissions of the NPRACH preamble may be configured to be a next higher number of repeated transmissions.

Preferably, the NPRACH preamble may comprise four symbol groups, and each of the four symbol groups may comprise a cyclic prefix part corresponding to three symbols and a sequence part corresponding to three symbols.

Preferably, symbol-level scrambling may be applied to each of the four symbol groups.

Preferably, symbol group-level scrambling may be applied to the four symbol groups.

Preferably, the NPRACH preamble may comprise four symbol groups, and each of the four symbol groups may comprise a cyclic prefix part having a three-symbol duration and a sequence part having a five-symbol duration.

Preferably, symbol-level scrambling may be applied to each of the four symbol groups.

Preferably, symbol group-level scrambling may be applied to the four symbol groups.

Preferably, a subcarrier spacing for the NPRACH preamble may be configured to be less than or equal to 1.5 kilohertz (kHz).

Preferably, the NPRACH preamble may comprise four symbol groups, and each of the four symbol groups may comprise a cyclic prefix part corresponding to one symbol and a sequence part corresponding to one symbol.

Preferably, the method may further comprises: receiving information indicating whether the guard time is applied to the last repeated transmission of the NPRACH preamble, wherein, when the information indicates that the guard time is not applied to the last repeated transmission of the NPRACH preamble and the time gap is smaller than the guard time, the last repeated transmission of the NPRACH preamble may be neither dropped nor punctured.

Preferably, when the information indicates that the guard time is applied to the last repeated transmission of the NPRACH preamble and the time gap is smaller than the guard time, the last repeated transmission of the NPRACH preamble may be dropped or be punctured by the difference between the guard time and the time gap.

Advantageous Effects

According to the present disclosure, a range can be effectively enhanced in performing the random access procedure in a wireless communication system.

Specifically, according to the present disclosure, a random access preamble for narrowband Internet of Things (NB-IoT) communication can be effectively transmitted and received in a wireless communication system supporting an extended cell radius.

It will be understood by persons skilled in the art that the objects that can be achieved with the present disclosure are not limited to what has been particularly described hereinabove and other objects that the present disclosure can achieve will be more clearly understood from the following detailed description.

DESCRIPTION OF DRAWINGS

The accompanying drawings, which are included to provide a further understanding of the disclosure, illustrate embodiments of the disclosure and together with the description serve to explain the principle of the disclosure.

FIG. 8 to FIG. 10 illustrate preamble formats according to Method 1 of the present disclosure.

FIG. 11 to FIG. 12 illustrate preamble formats according to Method 2 of the present disclosure.

FIG. 13 illustrates the number of repetitions and the time gap configured according to the present disclosure.

MODE FOR INVENTION

Figure 1:
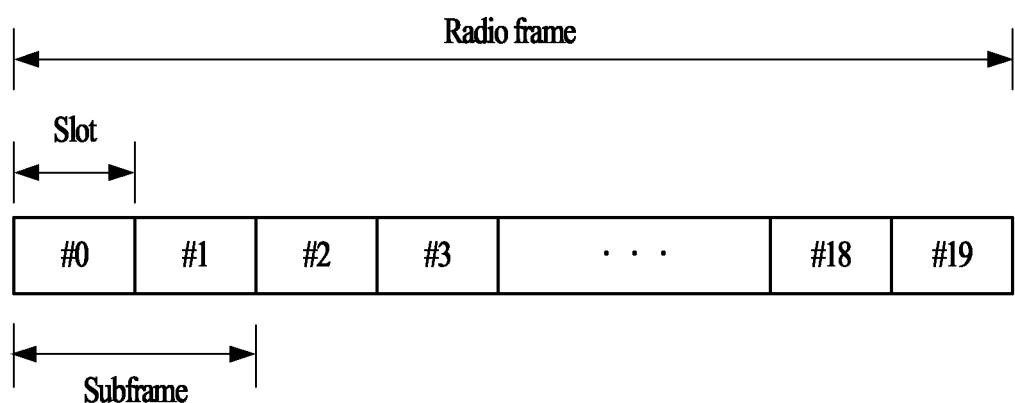
FIG. 1 illustrates a structure of a radio frame that may be used in the present disclosure.

The following embodiments of the present disclosure can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access network (UTRAN) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRAN (E-UTRAN). UTRAN is a part of universal mobile telecommunications system (UMTS). 3rd generation partnership project (3GPP) long term evolution (LTE) is a part of E-UMTS (Evolved UMTS), which uses E-UTRAN. 3GPP LTE-Advanced (LTE-A) system is an evolved version of 3GPP LTE, and LTE-A Pro system is an evolved version of 3GPP LTE-A.

For clarity of explanations, the following description focuses on 3GPP LTE/LTE-A/LTE-A Pro system. However, technical principles of the present disclosure are not limited thereto. Further, a particular terminology is provided for better understanding of the present disclosure. However, such a particular terminology may be changed without departing from the technical principles of the present disclosure. For example, the present disclosure may be applied to a system in accordance with a 3GPP LTE/LTE-A/LTE-A Pro system as well as a system in accordance with another 3GPP standard, IEEE 802.xx standard, 3GPP2 standard, or a next-generation communication system such as 3GPP 5G or New RAT (NR).

In the present specification, a user equipment (UE) may be fixed or mobile, and may be various kinds of equipment that transmit and receive data and/or control information to communicate with a base station (BS). The UE may be referred to as a terminal, mobile station (MS), mobile terminal (MT), user terminal (UT), subscribe station (SS), wireless device, personal digital assistant (PDA), wireless modem, handheld device, etc. In the present specification, a UE may be interchangeably referred to as a terminal.

In the present specification, a base station (BS) generally refers to a fixed station that performs communication with a UE and/or another BS, and exchanges various kinds of data and control information with the UE and another BS. The base station (BS) may be referred to as an advanced base station (ABS), a node-B (NB), an evolved node-B (eNB), next generation NodeB (gNB), a base transceiver system (BTS), an access point (AP), a processing server (PS), a transmission point (TP), etc. In the present specification, a base station (BS) may be interchangeably referred to as an eNB or gNB.

In a wireless access system, a user equipment (UE) may receive information from a base station (BS) in downlink (DL) and transmit information in uplink (UL). The information transmitted or received by the UE may include data and various control information. In addition, there are various physical channels according to the type or use of the information transmitted or received by the UE.

When a UE is powered on or enters a new cell, the UE performs initial cell search. The initial cell search involves acquisition of synchronization to a base station. To this end, the UE synchronizes its timing to the base station and acquires information such as a cell identifier (ID) by receiving a primary synchronization signal (PSS) and a secondary synchronization signal (SSS) from the base station. Then the UE may acquire system information broadcasted in the cell through a physical broadcast channel (PBCH) from the base station. During the initial cell search, the UE may monitor a DL channel state by receiving a downlink reference signal (DL RS).

After the initial cell search, the UE may acquire more detailed system information by receiving a physical downlink control channel (PDCCH) and receiving a physical downlink shared channel (PDSCH) based on information of the PDCCH.

To complete access to the base station, the UE may perform a random access procedure with the base station. To this end, the UE may transmit a preamble through a physical random access channel (PRACH) and may receive a response message to the preamble through a PDCCH and a PDSCH associated with the PDCCH. In the case of a contention-based random access, the UE may additionally perform a contention resolution procedure including transmission of an additional PRACH and reception of a PDCCH signal and a PDSCH signal corresponding to the PDCCH signal.

After the above procedure, the UE may receive a PDCCH and/or a PDSCH from the base station and transmit a physical uplink shared channel (PUSCH) and/or a physical uplink control channel (PUCCH) to the base station, in a general UL/DL signal transmission procedure. Information that the UE transmits to the base station is called Uplink Control Information (UCI). The UCI includes hybrid automatic repeat and request acknowledgement/negative acknowledgement (HARQ-ACK/NACK), scheduling request (SR), channel state information (CSI), etc. The CSI includes channel quality indicator (CQI), precoding matrix indicator (PMI), rank indication (RI), etc. UCI is generally transmitted through a PUCCH periodically. However, if control information and traffic data should be transmitted simultaneously, they may be transmitted through a PUSCH. In addition, the UCI may be transmitted aperiodically through the PUSCH, upon receipt of a request/command from a network.

FIG. 1 illustrates a structure of a radio frame that may be used in the present disclosure. In a cellular orthogonal frequency division multiplexing (OFDM) radio packet communication system, uplink/downlink data packet transmission is performed in subframe units and one subframe is defined as a predetermined duration including a plurality of OFDM symbols. The LTE(-A) standard supports a type-1 radio frame structure applicable to frequency division duplex (FDD) and a type-2 radio frame structure applicable to time division duplex (TDD).

FIG. 1 illustrates the structure of the type-1 radio frame. For example, a downlink radio frame includes 10 subframes and one subframe includes two slots in a time domain. A time required to transmit one subframe is referred to as a transmission time interval (TTI). Or, TTI may refer to a time interval required to transmit one slot. For example, one subframe has a length of 1 ms and one slot has a length of 0.5 ms. One slot includes a plurality of OFDM symbols in a time domain and includes a plurality of resource blocks (RBs) in a frequency domain. In the LTE(-A) system, since OFDM is used in downlink, an OFDM symbol indicates one symbol period. The OFDM symbol may be referred to as an SC-FDMA symbol or symbol period. A resource block (RB) as a resource allocation unit may include a plurality of consecutive subcarriers in one slot.

The number of OFDM symbols included in one slot may vary according to the configuration of a cyclic prefix (CP). The CP includes an extended CP and a normal CP. For example, if OFDM symbols are configured by the normal CP, the number of OFDM symbols included in one slot may be 7. If OFDM symbols are configured by the extended CP, since the length of one OFDM symbol is increased, the number of OFDM symbols included in one slot is less than the number of OFDM symbols in case of the normal CP. In case of the extended CP, for example, the number of OFDM symbols included in one slot may be 6. In the case where a channel state is unstable, such as the case where a UE moves at a high speed, the extended CP may be used in order to further reduce inter-symbol interference.

The type-2 radio frame includes two half frames and each half frame includes five subframes, a downlink pilot time slot (DwPTS), a guard period (GP) and an uplink pilot time slot (UpPTS). One subframe includes two slots. For example, a downlink slot (e.g., DwPTS) is used for initial cell search, synchronization or channel estimation of a UE. For example, an uplink slot (e.g., UpPTS) is used for channel estimation of a base station and uplink transmission synchronization of a UE. For example, the uplink slot (e.g., UpPTS) may be used to transmit a sounding reference signal (SRS) for channel estimation in a base station and to transmit a physical random access channel (PRACH) that carriers a random access preamble for uplink transmission synchronization. The GP is used to eliminate interference generated in uplink due to multi-path delay of a downlink signal between uplink and downlink.

The above-described radio frame structures are purely exemplary, and thus the number of subframes in a radio frame, the number of slots in a subframe, or the number of symbols in a slot may vary in different ways.

Figure 2:
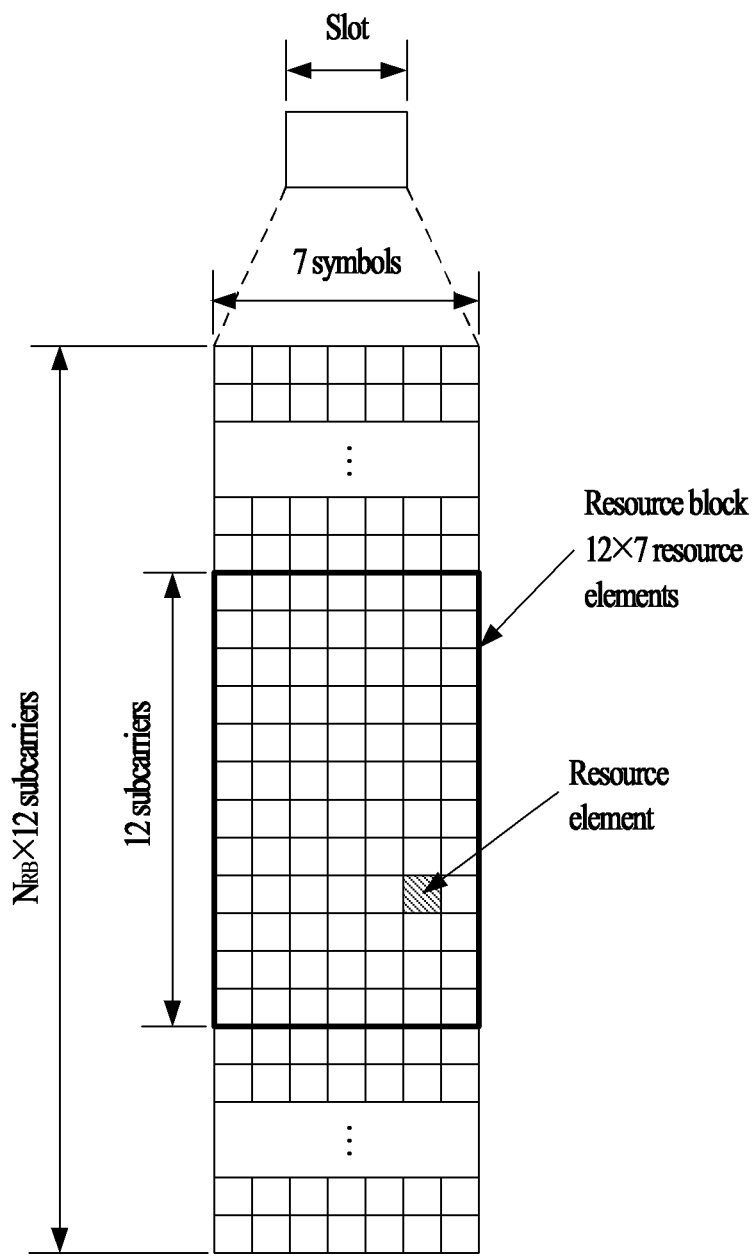
FIG. 2 illustrates a resource grid of a downlink slot that may be used in the present disclosure.

FIG. 2 illustrates a resource grid of one downlink slot that may be used in the present disclosure.

Referring to FIG. 2, a downlink slot includes a plurality of OFDM symbols in the time domain. One downlink slot may include 7 OFDM symbols and a resource block (RB) may include 12 subcarriers in the frequency domain. However, the present disclosure is not limited thereto. Each element of the resource grid is referred to as a Resource Element (RE). One RB includes 12×7 REs. The number of RBs in a DL slot, $N^{DL}$, depends on a downlink transmission bandwidth. An uplink slot may have the same structure as a downlink slot.

The above-described resource grid of a slot is exemplary, and thus the number of symbols, the number of resource elements, the number of RBs included in the slot may vary in different ways.

Figure 3:
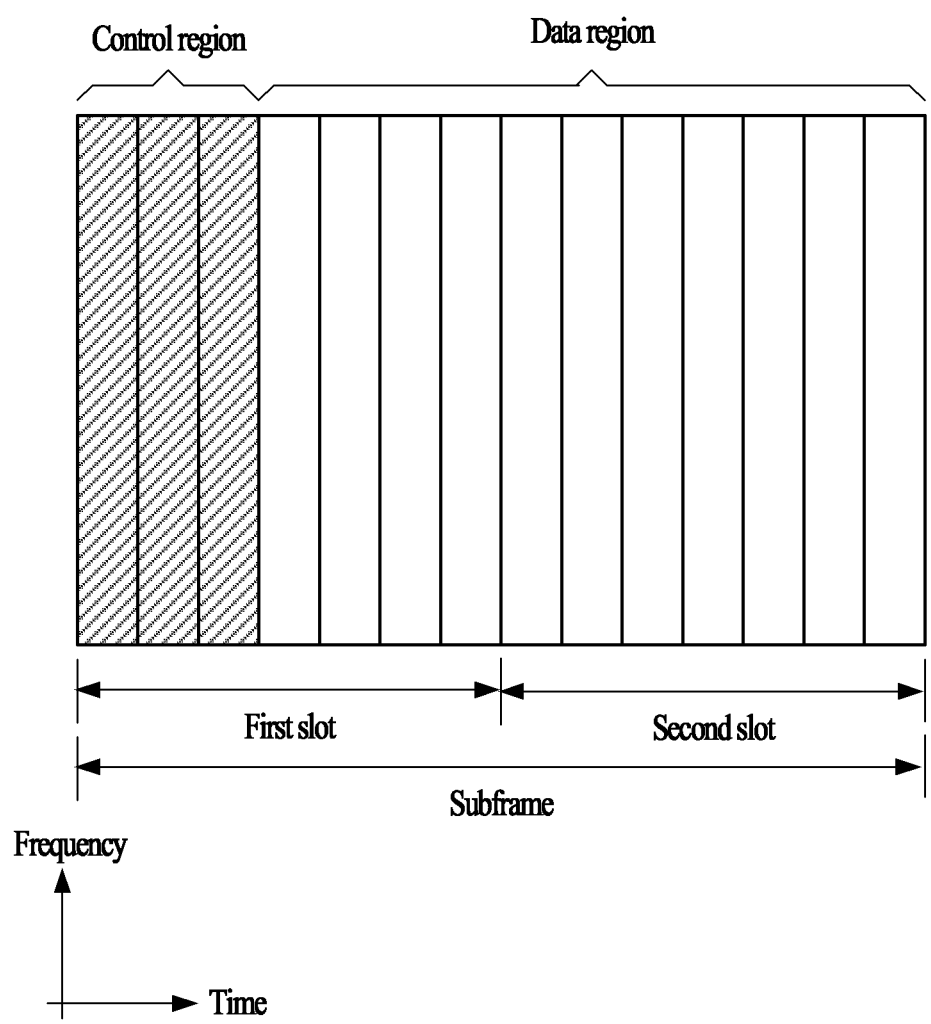
FIG. 3 illustrates a downlink subframe structure that may be used in the present disclosure.

FIG. 3 illustrates a downlink subframe structure that may be used in the present disclosure.

Referring to FIG. 3, a maximum of three (or four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is RB. Examples of downlink control channels used in the LTE(-A) system include a physical control format indicator channel (PCFICH), a physical downlink control channel (PDCCH), a physical hybrid ARQ indicator channel (PHICH), etc.

PCFICH is transmitted at the first (or starting) OFDM symbol of a subframe and carries information regarding the number of OFDM symbols used for transmission of control channels within the subframe. The PCFICH is composed of four resource element groups (REGs), and each REG is uniformly distributed in a control region based on a cell ID. One REG may comprise 4 resource elements. The PCFICH indicates a value of 1 to 3 (or 2 to 4) and is modulated via quadrature phase shift keying (QPSK). The PHICH is a response of uplink transmission and carries an HARQ ACK/NACK signal. The PHICH is allocated on the remaining REGs other than CRS and PCFICH (a first OFDM symbol) in one or more OFDM symbols configured by PHICH duration. The PHICH is allocated to three REGs that are distributed if possible in the frequency domain. More detailed description regarding PHICH will be provided below in the present specification.

The PDCCH is allocated in first n OFDM symbols (hereinafter, a control region) of a subframe. Here, n is an integer equal to or greater than 1 and is indicated by the PCFICH. Control information transmitted through the PDCCH is referred to as downlink control information (DCI). A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The base station determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC. When the PDCCH is for uplink power control, transmit power control-RNTI (TPC-RNTI) may be used, and the TPC-RNTI may include TPC-PUCCH-RNTI for PUCCH power control and TPC-PUSCH-RNTI for PUSCH power control. When the PDCCH is for multicast control channel (MCCH), multimedia broadcast multicast service-RNTI (M-RNTI) may be used.

Control information transmitted through the PDCCH is referred to as downlink control information (DCI). Various DCI formats are defined according to their usage. Specifically, DCI format 0, 4 (hereinafter, UL grant) are defined for uplink scheduling, and DCI formats 1, 1A, 1B, 1C, 1D, 2, 2A, 2B, 2C, and 2D (hereinafter, DL grant) are defined for downlink scheduling. DCI format optionally includes information about hopping flag, RB allocation, modulation coding scheme (MCS), redundancy version (RV), new data indicator (NDI), transmit power control (TPC), cyclic shift demodulation reference signal (DM-RS), channel quality information (CQI) request, HARQ process number, transmitted precoding matrix indicator (TPMI), precoding matrix indicator (PMI) confirmation, etc. according to its usage.

The LTE(-A) system defines a limited set of CCE positions in which a PDCCH is to be positioned for each UE. A limited set of CCE positions that a UE can find a PDCCH of the UE may be referred to as a search space (SS). In the LTE(-A) system, the search space has different sizes according to each PDCCH format. In addition, a UE-specific search space and a common search space are separately defined. The base station does not provide the UE with information indicating where the PDCCH is located in the control region. Accordingly, the UE monitors a set of PDCCH candidates within the subframe and finds its own PDCCH. The term "monitoring" means that the UE attempts to decode the received PDCCHs according to respective DCI formats. The monitoring for a PDCCH in a search space is referred to as blind decoding (or blind detection). Through blind decoding, the UE simultaneously performs identification of the PDCCH transmitted to the UE and decoding of the control information transmitted through the corresponding PDCCH.

Figure 4:
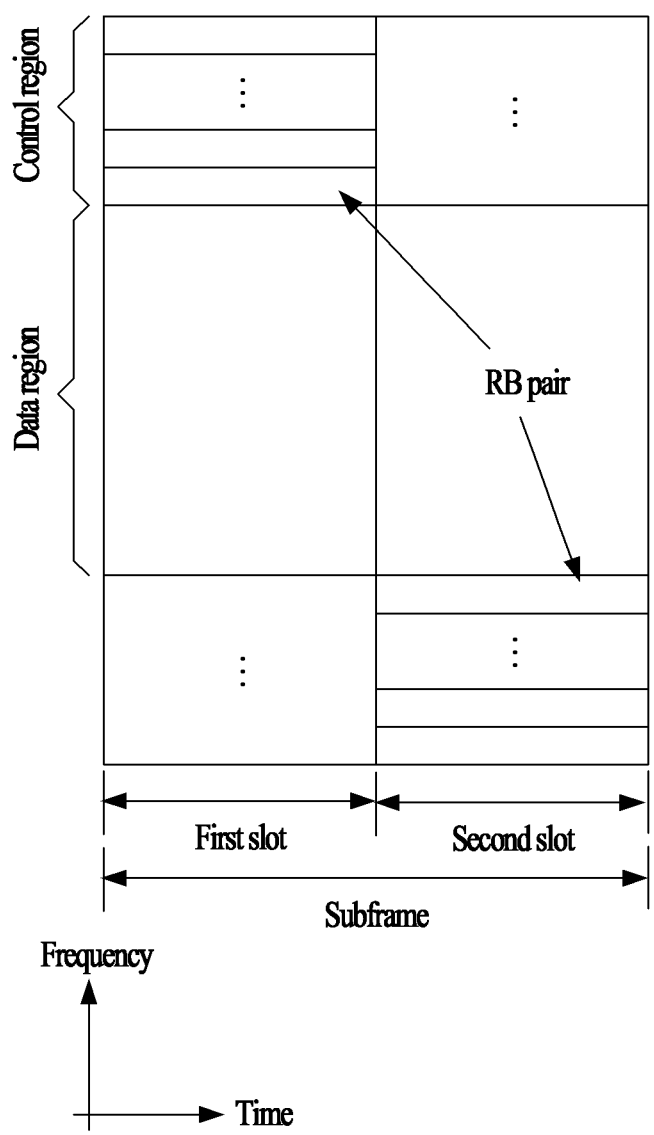
FIG. 4 illustrates an uplink subframe structure that may be used in the present disclosure.

FIG. 4 illustrates an exemplary structure of an uplink subframe that may be used in the present disclosure.

Referring to FIG. 4, the uplink subframe includes a plurality of slots (for example, two). Each slot may include a plurality of SC-FDMA symbols, wherein the number of SC-FDMA symbols included in each slot is varied depending on a cyclic prefix (CP) length. In an example, a slot may comprise 7 SC-FDMA symbols in case of normal CP. An uplink subframe is divided into a data region and a control region in a frequency domain. The data region includes a PUSCH, and is used to transmit a data signal that includes voice information. The control region includes a PUCCH, and is used to transmit uplink control information (UCI). The PUCCH includes RB pair (e.g. m=0, 1, 2, 3) located at both ends of the data region on a frequency axis, and performs hopping on the border of the slots.

Figure 5:
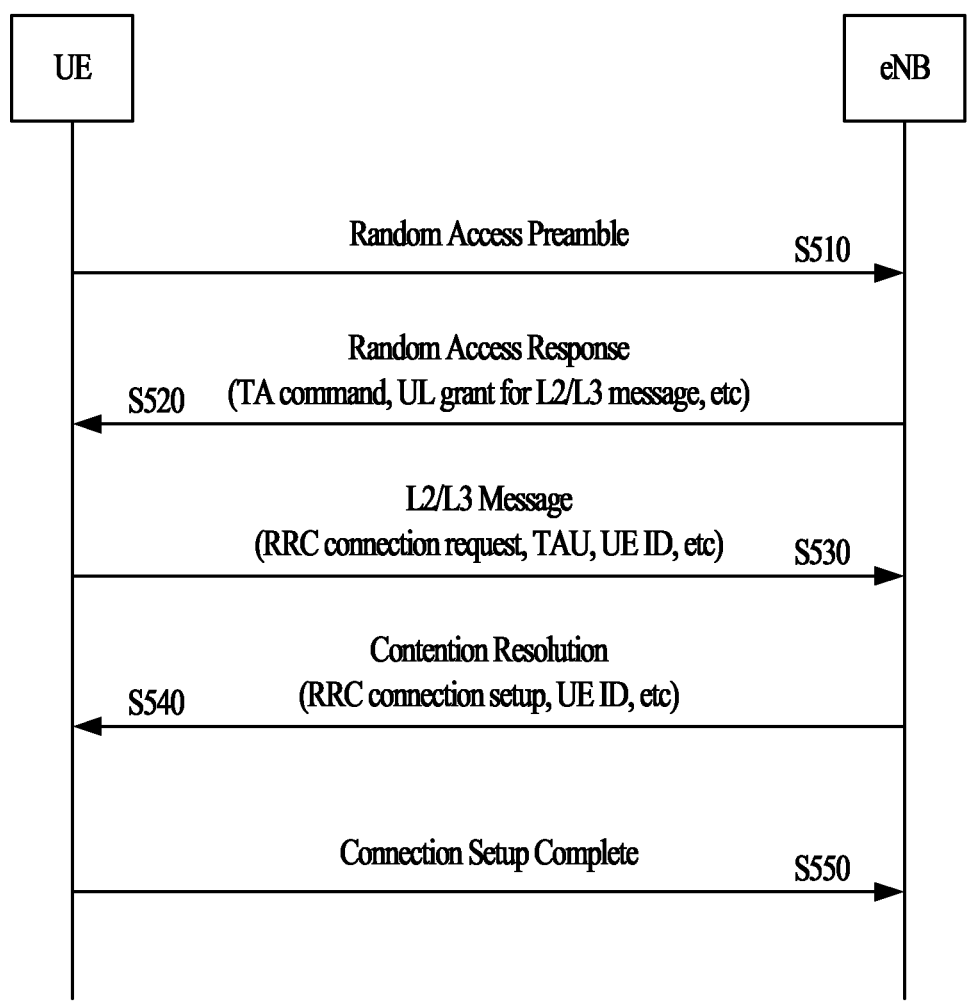
FIG. 5 illustrates a random access procedure.

FIG. 5 illustrates a random access procedure.

The random access procedure is used to transmit (short-length) data in uplink. For example, the random access procedure is performed upon initial access in an RRC_IDLE state, upon initial access after radio link failure, upon handover requiring the random access procedure, and upon the occurrence of uplink/downlink data requiring the random access procedure during an RRC_CONNECTED state. Some RRC messages such as an RRC connection request message, a cell update message, and a URA update message are transmitted using a random access procedure. Logical channels such as a Common Control Channel (CCCH), a Dedicated Control Channel (DCCH), or a Dedicated Traffic Channel (DTCH) can be mapped to a transport channel (RACH). The transport channel (RACH) can be mapped to a physical channel (e.g., Physical Random Access Channel (PRACH)). When a UE MAC layer instructs a UE physical layer to transmit a PRACH, the UE physical layer first selects an access slot and a signature and transmits a PRACH preamble in uplink. The random access procedure is divided into a contention-based procedure and a non-contention-based procedure.

With reference to FIG. 5, a UE receives and stores information regarding random access from a base station through system information. Thereafter, when random access is needed, the UE transmits a random access preamble (referred to as Message 1 or Msg1) to the base station (S510). Upon receiving the random access preamble from the UE, the base station transmits a random access response message (referred to as Message 2 or Msg2) to the UE (S520). Specifically, downlink scheduling information for the random access response message may be CRC-masked with a Random Access-RNTI and may be transmitted through an L1/L2 control channel (PDCCH). Upon receiving the downlink scheduling signal masked with the RA-RNTI, the UE may receive and decode a random access response message from a Physical Downlink Shared Channel (PDSCH). Thereafter, the UE checks whether or not random access response information corresponding to the UE is present in the received random access response message. Whether or not random access response information corresponding to the UE is present can be determined based on whether or not a Random Access preamble ID (RAID) for the preamble that the UE has transmitted is present. The random access response information includes Timing Advance (TA) indicating timing offset information for synchronization, information of allocation of radio resources used in uplink, and a temporary identity (e.g., T-CRNTI) for user identification. Upon receiving the random access response information, the UE transmits an uplink message (referred to as Message 3 or Msg3) including an RRC connection request message through an uplink Shared Channel (SCH) according to radio resource allocation information included in the response information (S530). After receiving the uplink message from the UE, the base station transmits a message for contention resolution (referred to as Message 4 or Msg4) to the UE (S540). The message for contention resolution may be referred to as a contention resolution message, and may include an RRC connection setup message. After the UE receives the contention resolution message, the UE transmits a connection setup complete message (referred to as Message 5 or Msg5) to the base station (S550).

In case of a non-contention based procedure, a base station may allocate a non-contention random access preamble to a UE before the UE transmits a random access preamble (S510). The non-contention random access preamble may be allocated through a dedicated signaling such as a handover command or PDCCH. In case that a UE is allocated with a non-contention random access preamble, the UE may transmit the allocated non-contention random access preamble to a base station in a similar manner as S510. If the base station receives the non-contention random access preamble from the UE, the base station may transmit a random access response (referred to as Message 2) to the UE in a similar manner as S520.

During the above-described random access procedure, HARQ may not be applied to a random access response (S520), but HARQ may be applied to an uplink transmission for the random access response or a message for contention resolution. Thus, the UE does not have to transmit ACK/NACK in response the random access response.

A next generation of LTE-A system is considering to configure a user equipment (UE) at a low cost/low specification mainly focusing on data communication such as metering of a gauge meter, measurement of a water level, utilization of a monitoring camera, inventory report of a vending machine, and the like. Such a UE is to provide appropriate throughputs between connected devices even though it has a low complexity and consumes low power, and the UE is referred to as a machine type communication (MTC) UE or IoT (Internet of Things) UE for convenience, and the UE may be briefly referred to as a user equipment (UE).

Further, when the next generation system utilizes a cellular network or a third-party network, the next generation system can perform communication using a narrow band (or NB-IoT communication). For example, the narrow band may be 180 kHz. A UE (or NB-IoT UE) or an eNB transmits a single channel or a plurality of physical channels by multiplexing the channel(s) in a corresponding region. Meanwhile, the NB-IoT UE can perform communication even in such an area where channel environment is poor as under a bridge, under the sea, on the sea, and the like. In this case, in order to compensate for the poor channel environment, the NB-IoT UE may perform repetitive transmission on a specific channel (e.g., repetitive transmission during several TTIs) and/or perform power boosting. As an example of the power boosting, a region of a frequency resource to be transmitted on a specific band is more reduced to concentrate power per hour on a specific resource. For example, when a specific channel is transmitted via an RB (resource block) consisting of 12 REs, it may concentrate power to be distributed via the entire RB on a specific RE(s) by allocating the power to the specific RE instead of RE allocation in an RB unit. In particular, a scheme of performing communication by concentrating data and power on a single RE belonging to an RB is commonly referred to as a single-tone transmission scheme. NB-IoT may be interchangeably referred to as cellular IoT (cIoT).

Figure 6:
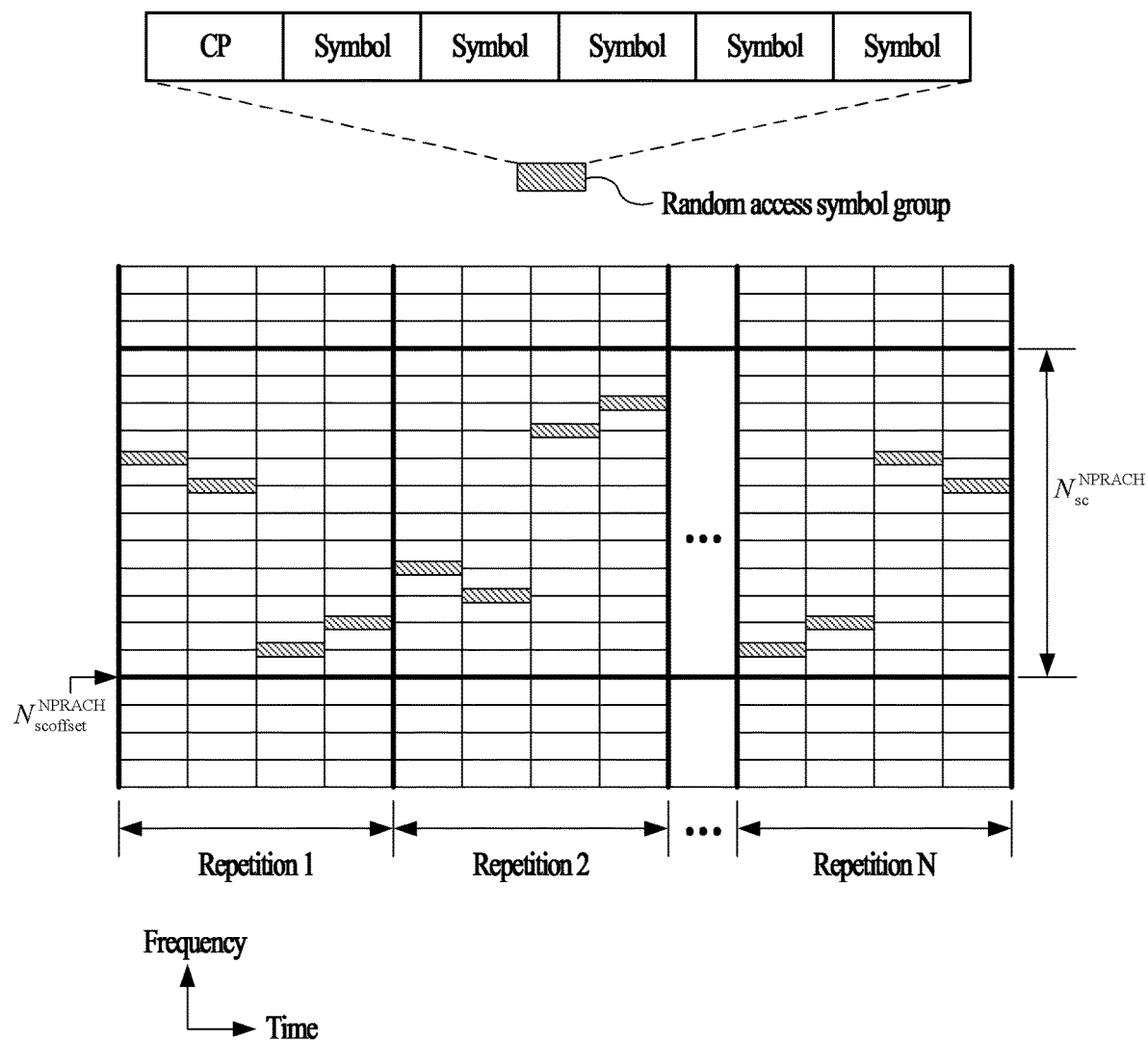
FIG. 6 illustrates an NPRACH preamble transmission method.

FIG. 6 illustrates an NPRACH preamble transmission method. The NPRACH preamble refers to a PRACH preamble for NB-IoT supported by the LTE-A Pro system and may be collectively referred to as a PRACH preamble. The random access symbol group of FIG. 6 may be referred to as an (N)PRACH symbol group, or simply as a symbol group.

The NPRACH preamble may be composed of four symbol groups (symbol group 0 to symbol group 3), and each symbol group may be composed of a cyclic prefix (CP) and a sequence part as illustrated in FIG. 6. The sequence part may consist of five subblocks, each of the subblocks including the same symbol. For example, the same symbol may have a fixed symbol value of 1.

The NPRACH preamble may be transmitted within a designated frequency region. The frequency region may be determined by a subcarrier offset (e.g., $N_{scoffset}^{NPRACH}$) and the number of subcarriers (e.g., $N_{sc}^{NPRACH}$) configured through a higher layer signal (e.g., an RRC layer signal) or system information (e.g., SIB2). Each symbol group constituting the NPRACH preamble is transmitted without a gap, and frequency hopping is performed in each symbol group within the designated frequency region. In frequency hopping, the frequency position of the (i+1)-th symbol group (i.e., symbol group i, where i=0, 1, 2, 3) is denoted by $n_{sc}^{RA}(i)$ and may be determined by Equation 1.

$$n_{sc}^{RA}(i) = n_{start} + \tilde{n}_{SC}^{RA}(i) \quad \text{[Equation 1]}$$

In Equation 1, $n_{start}$ denotes a start subcarrier index of the NPRACH preamble and is determined by Equation 2. In Equation 1, $\tilde{n}_{SC}^{RA}(i)$ denotes a subcarrier offset and is determined by Equation 3. In Equation 2, $N_{sc}^{RA}$=12 may be given.

$$n_{start} = N_{scoffset}^{NPRACH} + \lfloor n_{init} / N_{sc}^{RA} \rfloor \cdot N_{sc}^{RA} \qquad \text{[Equation 2]}$$

[Equation 3]
$$\tilde{n}_{sc}^{RA}(i) = \begin{cases} (\tilde{n}_{sc}^{RA}(0) + f(i/4)) \bmod N_{sc}^{RA} & i \bmod 4 = 0 \text{ and } i > 0 \\ \tilde{n}_{sc}^{RA}(i-1) + 1 & i \bmod 4 = 1, 3 \text{ and } \tilde{n}_{sc}^{RA}(i-1) \bmod 2 = 0 \\ \tilde{n}_{sc}^{RA}(i-1) - 1 & i \bmod 4 = 1, 3 \text{ and } \tilde{n}_{sc}^{RA}(i-1) \bmod 2 = 1 \\ \tilde{n}_{sc}^{RA}(i-1) + 6 & i \bmod 4 = 2 \text{ and } \tilde{n}_{sc}^{RA}(i-1) < 6 \\ \tilde{n}_{sc}^{RA}(i-1) - 6 & i \bmod 4 = 2 \text{ and } \tilde{n}_{sc}^{RA}(i-1) \geq 6 \end{cases}$$

$$f(t) = \left( f(t-1) + \left( \sum_{n=10t+1}^{10t+9} c(n) 2^{n-(10t+1)} \right) \bmod (N_{sc}^{RA} - 1) + 1 \right) \bmod N_{sc}^{RA}$$

$$f(-1) = 0$$

In Equation 3, $\tilde{n}_{sc}^{RA}(0)$ denotes a subcarrier offset for symbol group 0 of the NPRACH preamble and is determined by Equation 4. In Equation 3, c(n) is determined by Equation 5. In Equation 4, $n_{init}$ is a value selected from {0, 1, . . . , $N_{sc}^{NPRACH}$−1}.

$$\tilde{n}_{SC}^{RA}(0) = n_{init} \bmod N_{sc}^{RA} \qquad \text{[Equation 4]}$$

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{[Equation 5]}$$

In Equation 5, $N_C$=1600, and $x_1(0)$=1, $x_1(n)$=0, n=1, 2, . . . , 30 may be given.

The NPRACH preamble may be repeatedly transmitted a specific number of times (e.g., N times in FIG. 6) for coverage enhancement or coverage extension. The specific number of repetitions may be configured through a higher layer signal (e.g., an RRC layer signal) or system information (e.g., SIB2). Four symbol groups constituting the NPRACH preamble (symbol group 0 to symbol group 3) are transmitted while hopping to a frequency position determined for each symbol group using Equations 1 to 5. After the first NPRACH preamble is transmitted in this way, each of the symbol groups of the second NPRACH preamble may also be transmitted through frequency hopping based on Equations 1 to 5. Using the same method, the NPRACH preamble may be repeatedly transmitted a specific number of times (e.g., N times). The frequency position of the first symbol group (i.e., symbol group 0) of each NPRACH preamble that is repeatedly transmitted may be randomly determined.

Since the symbol groups of the NPRACH preamble illustrated in FIG. 6 are transmitted without a gap, the guard time is not applied to the NPRACH preamble. Accordingly, for the NPRACH preamble illustrated in FIG. 6, a supported cell radius may be determined in consideration of the CP duration instead of the guard time. In general, the relationship between the cell radius and the round trip delay (RTD) may be represented by (Cell radius)=(Light speed)*(RTD/2), and the RTD corresponds to a guard time. Thus, the relationship between the cell radius and the CP duration may be represented by Equation 6.

(Cell radius)=(Light speed)*(CP duration/2)  [Equation 6]

Table 1 exemplarily shows approximate values of the CP duration and cell radius according to the NPRACH preamble formats. As exemplarily shown in Table 1, the NPRACH preamble formats may include formats 0 and 1. The NPRACH preamble formats may have the same sequence length and different CP durations. The CP duration may be configured through a higher layer signal (e.g., an RRC layer signal) or system information (e.g., SIB2), and the corresponding NPRACH preamble format may be determined according to the CP duration. In Table 1, 'us' denotes microseconds and 'km' denotes kilometers.

TABLE 1

| Preamble format | CP duration (us) | Sequence (us) | GT duration (us) | Max. cell radius (km) |
|---|---|---|---|---|
| 0 | 67.5 | 1333.33 | N/A | 10.1 |
| 1 | 266.7 | 1333.33 | N/A | 40.0 |

In addition, a guard time (GT) may be given in consideration of an RTD according to the cell radius. For example, when a UE at the edge of a cell and a UE at the center of the cell transmit a PRACH preamble in the same TTI (e.g., subframe or slot), a guard time may be given to ensure that the base station can receive the PRACH preamble of each UE within the corresponding TTI. In general, since the relationship between the cell radius and the RTD may be represented by (Cell radius)=(Light speed)*(RTD/2) and the RTD corresponds to a guard time, the relationship between the cell radius and the guard time may be represented by Equation 7.

(Cell radius)=(Light speed)*(GT/2)  [Equation 7]

Table 2 exemplarily shows approximate values of the CP duration, GT duration, and cell radius according to the preamble formats of the legacy LTE/LTE-A system. In Table 2, the preamble format values are indicated by the PRACH configuration indexes. Preamble format 0 may be transmitted in one TTI (e.g., 1 ms), preamble formats 1 and 2 may be transmitted in two TTIs (e.g., 2 ms), and preamble format 3 may be transmitted in three TTIs (e.g., 3 ms). Here, denotes milliseconds. In Table 2, 'us' denotes microseconds and 'km' denotes kilometers.

TABLE 2

| Preamble format | CP duration (us) | GT duration (us) | Max. delay spread (us) | Max. cell radius (km) |
|---|---|---|---|---|
| 0 | 103.1 | 96.88 | 6.3 | 14.5 |
| 1 | 684.4 | 515.6 | 16.7 | 77.3 |
| 2 | 203.1 | 196.9 | 6.3 | 29.5 |
| 3 | 684.4 | 715.6 | 16.7 | 100.2 |

As can be seen from Table 2, the maximum cell radius supported by the current LTE system is 100.2 km. Accordingly, in order to perform in-band operation using an LTE network, the UE for NB-IoT needs to support at least the same level of cell radius.

Figure 7:
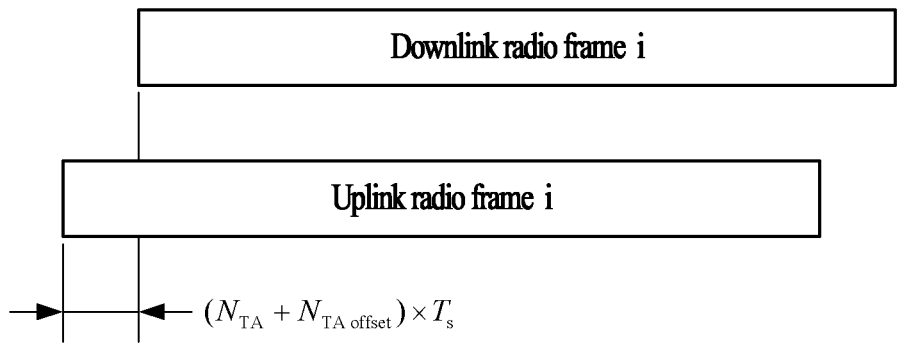
FIG. 7 illustrates an uplink-downlink timing relation.

FIG. 7 illustrates an uplink-downlink timing relation.

For uplink orthogonal transmission and reception, the base station may need to manage or adjust uplink transmission timing of each UE individually. Management or adjustment of transmission timing performed by the base station may be referred to as timing advance or timing alignment.

Timing advance or timing alignment may be performed through a random access procedure as described above. During the random access procedure, the base station may receive a random access preamble from the UE and calculate a timing advance value using the received random access preamble. The calculated timing advance value may be transmitted to the UE through a random access response, and the UE may update the signal transmission timing based on the received timing advance value. Alternatively, the base station may receive an uplink reference signal (e.g., a sounding reference signal (SRS)) that is periodically or randomly transmitted from the UE and calculate a timing advance, and the UE may update the signal transmission timing based on the calculated timing advance value.

As described above, the base station may measure the timing advance of the UE through a random access preamble or an uplink reference signal and may inform the UE of an adjustment value for timing alignment. In this case, the adjustment value for timing alignment may be referred to as a timing advance command (TAC) or a timing advance (TA) value.

Referring to FIG. 7, the transmission of uplink radio frame i from a UE may start $(N_{TA}+N_{TAoffset}) \times T_s$ seconds before the corresponding downlink radio frame starts, where $N_{TA}$ may be $0 \leq N_{TA} \leq 20512$, and $N_{TAoffset}$ may be 0 ($N_{TAoffset}=0$) for an FDD frame structure and 624 ($N_{TAoffset}=624$) for a TDD frame structure. $N_{TA}$ may be indicated by a TAC. $T_s$ denotes a sampling time. The uplink transmission timing may be adjusted in units of multiples of $16T_s$. The TAC may be given in 11 bits in the random access response and may indicate a value from 0 to 1282. $N_{TA}$ may be given as TA*16. Alternatively, the TAC may be given in 6 bits and indicate a value from 0 to 63. In this case, $N_{TA}$ may be given as $N_{TA,old}+(TA-31)*16$. The TAC received in subframe n may be applied to subframes, starting in subframe n+6.

As described above, the conventional NB-IoT system is designed based on the Global System for Mobile communications (GSM) network, which supports a cell radius of 35 km, and thus the cyclic prefix (CP) of the random access preamble is designed to support only cell radius of about 40 km. However, in order to support in-band operation in the LTE network, which is one of typical deployment scenarios of the NB-IoT system, it is necessary to support a cell radius of up to 100 km. In addition, the NB-IoT system includes a mobile autonomous reporting system at a place where humans are rare, that is, where the LTE network is not well equipped, and thus it is desirable to extend the supportable cell radius.

In order to extend the maximum supportable cell radius of the random access preamble, the CP and guard time (GT) of the (NPRACH) preamble may be generally extended. Additionally or alternatively, it may be considered to narrow the subcarrier spacing of the (NPRACH) preamble to suppress the increase in CP overhead. For example, in order to support a cell radius of 100 km, the CP duration may be determined as 666.7 us (see Equation 6). A CP extended to support the extended cell radius is referred to as an extended CP (E-CP). In addition, a time gap having the same duration (e.g., 666.7 us) as the E-CP may be needed to avoid a case where the random access preamble received from the UE overlaps with the next adjacent subframe from the base station perspective. This time gap is referred to as a guard time (GT).

Both the cyclic prefix and the guard time have been added to avoid interference between symbols. In other words, since the cyclic prefix and the guard time are additional signals added in terms of performance, they may be classified as overhead in terms of system throughput. Therefore, to ensure more efficient preamble transmission, it may be considered to reduce the percentage overhead (% overhead) of the cyclic prefix, and increase a portion (e.g., symbols or symbol group portion) corresponding to the preamble information except the cyclic prefix and the guard time.

As described with reference to FIG. 7, it is necessary for a base station to individually control uplink transmission timing of each UE for uplink orthogonal transmission and reception. This process is referred to as timing advance (TA) or timing alignment. Initial TA is performed through a random access procedure. In the NB-IoT system, when the UE transmits a random access preamble, the base station estimates an uplink transmission delay from the received preamble and transmits the uplink transmission delay to the UE through a random access response (RAR) message in the form of a TA command. The UE adjusts the transmission timing using the TA command received through the RAR message.

As described with reference to FIG. 6, the random access preamble (or NPRACH preamble) for NB-IoT is transmitted in a manner of single carrier frequency hopping, and is designed considering both the timing estimation acquisition range and accuracy. The subcarrier spacing of the conventional random access preamble (or NPRACH preamble) is designed to enable timing estimation without ambiguity within a cell radius of 40 km at 3.75 kHz. When timing estimation is to be performed using the spacing between two subcarriers, a supportable cell radius without ambiguity may be calculated as follows. In estimation using the spacing between two subcarriers, the phase difference between the signals transmitted on the two subcarriers may be represented as 2*pi*delta_f, and delta_f represents the subcarrier spacing in Hz (Hertz). In addition, a phase difference between the signals transmitted on two subcarriers in consideration of the RTD may be represented as 2*pi*delta_f*tau_RTT, where tau_RTT denotes an RTD. In order for the phase difference and the cell radius to have values satisfying a one-to-one correspondence relationship, 2*pi*delta_f*tau_RTT<2*pi should be satisfied. Thus, to ensure estimation without ambiguity, the relationship of tau_RTT<1/delta_f should be satisfied. The round trip distance is tau_RTT*(light speed)/2, where light speed=3E8 m/s. Accordingly, when the subcarrier spacing is 3.75 kHz, the cell radius is 1/delta_f*3E8/2=1/3.75 (kHz)*3E8 (m/s)/2=40 km. Since the cell radius within which timing estimation without ambiguity is allowed at 3.75 kHz subcarrier spacing of the legacy random access preamble (or NPRACH preamble) is 40 km, the subcarrier spacing should be narrowed to 1.5 kHz or less to support the cell radius of 100 km.

The present disclosure is intended to enable the NB-IoT system to be used on the LTE network or a network supporting the maximum cell radius of the LTE system. Specifically, proposed herein is a method for improving a random access preamble (or NPRACH preamble) to allow a random access procedure for NB-IoT to be performed on the LTE network or a network supporting the maximum cell radius of the LTE system.

More specifically, the present disclosure proposes a method for extending the cyclic prefix of the random access preamble to at least 666.7 us to support an extended cell radius (e.g., 100 km) while narrowing the subcarrier spacing of the random access preamble (or NPRACH preamble) to 1.5 kHz or less to perform timing estimation without ambiguity (see Method 2), and a method for addressing the timing estimation ambiguity occurring at the 3.75 kHz subcarrier spacing (see Method 1).

For simplicity, the random access preamble supporting the extended cell radius (e.g., 100 km) as proposed in the present disclosure is defined as an "enhanced" preamble, and the conventional random access preamble is referred to as a "legacy" preamble. In the present specification, the legacy preamble may be referred to as a first preamble format, and the enhanced preamble may be referred to as a second preamble format. In the present disclosure, the terms "random access preamble," "(N)PRACH preamble," "(N)PRACH signal" and "(N)PRACH" may be used interchangeably and may be referred to simply as a preamble. In the present disclosure, the terms "PRACH symbol group" and "random access symbol group" may be used interchangeably and may be referred to simply as a symbol group. In addition, a UE supporting the conventional NB-IoT (or the legacy preamble) may be referred to as a legacy UE, and a UE supporting the enhanced preamble (or both the legacy preamble and the enhanced preamble) may be referred to as an enhanced UE.

The present disclosure is described based on a user equipment/base station/system supporting NB-IoT, but the present disclosure is not limited thereto. The present disclosure may be also applied to a user equipment/base station/system that does not support NB-IoT communication in the same manner. For example, the present disclosure may be applied not only to user equipment/base station/system supporting massive machine type communication (mMTC) but also to typical user equipment/base station/system not supporting IoT and MTC. In the present specification, a user equipment/base station/system may collectively refer to a user equipment/base station/system supporting NB-IoT and a user equipment/base station/system not supporting NB-IoT.

NPRACH Range Enhancement Method 1: Using the Same Subcarrier Spacing as the Conventional System Method 1 extends the cyclic prefix to at least 666.7 us and allows the base station to resolve timing estimation ambiguity that may occur because of using 3.75 kHz subcarrier spacing. Method 1 of the present disclosure proposes that the first three symbols in a symbol group constituting a random access preamble (or NPRACH preamble) be used for the cyclic prefix in order to extend the CP, and the remaining symbols be used for preamble detection and timing estimation.

FIG. 8 illustrates a preamble format according to Method 1 of the present disclosure.

The number of symbols used as the CP within a symbol group constituting the conventional random access preamble (or NPRACH preamble) for NB-IoT (e.g., see FIG. 7 and related description) may be increased to extend the cyclic prefix without reducing the subcarrier spacing. As described with reference to FIG. 7, the legacy preamble is composed of four symbol groups, and may have a structure of '111111' '111111' '111111' '111111' when frequency hopping is not taken into account. Since the legacy NPRACH preamble is composed of a sequence in which all symbols are '1', the structure of the preamble according to Method 1 is not different from the legacy preamble structure. However, in order to support the cell radius of 100 km, the first three symbols '111' are regarded as an enhanced CP (E-CP), and preamble detection and timing estimation are performed using the remaining three symbols except the first three symbols.

Referring to FIG. 8(a), except for CP, the remaining part actually used for preamble detection and timing estimation is defined as 'useful' symbols. According to this definition, in the legacy random access preamble, the CP is one symbol (in a symbol group) and the number of useful symbols is five. On the other hand, in the enhanced preamble, the E-CP corresponds to three symbol intervals (in a symbol group), and the number of useful symbols is 3. In the case of the legacy preamble, only the first one symbol '1' (in a symbol group) corresponds to CP and thus supports a cell radius of 40 km. On the other hand, in the case of E-CP of the enhanced preamble (in a symbol group), "111" corresponding to three symbols supports a cell radius of 120 km.

The enhanced preamble uses the first three symbols (in a symbol group) for E-CP, resulting in increase of CP overhead from 16.7% (=1/6*100%) in the conventional case to 50% (=3/6%100%). In order to reduce the % overhead of the CP and increase the energy of a useful signal per symbol group, the number of symbols per symbol group, which is 6 in conventional cases, may be increased. Here, the useful energy is preamble signal energy collected by useful symbols, and refers to energy used for preamble detection or timing estimation. For example, an enhanced preamble may be designed to have the following structure.

Enhanced Preamble Structure 1-1: '11111111' '11111111' '11111111' '11111111'

Enhanced preamble structure 1-1 is a method of increasing the number of symbols in a symbol group in order to reduce CP overhead. For example, in the enhanced preamble structure 1-1, the preamble consists of four symbol groups as in the conventional cases, but each symbol group consists of 8 symbols in total. Thus, the enhanced preamble structure 1-1 is designed to have the same number of useful symbols as the conventional cases while supporting the E-CP. FIG. 8(b) illustrates a symbol group according to Structure 1-1 of the present disclosure.

Considering a case where boundary alignment with the symbol groups of the legacy preamble is needed in the same direction and at the same time, the number of symbols in a symbol group may be increased to 9 or 12. In this case, the symbol group may include an E-CP corresponding to 3 symbols and a sequence part corresponding to 6 or 9 symbols. In particular, in the case where one symbol group is composed of 12 symbols, the legacy preamble boundary and the enhanced preamble boundary may be aligned without increasing overhead compared to the legacy preamble, and thus may be efficient in terms of NPRACH resource sharing or the like. While it is illustrated that the number of symbols constituting the symbol group is 9 or 12, embodiments are not limited thereto. The present disclosure is applicable even to a symbol group including other numbers of symbols.

Enhanced Preamble Structure 1-2: CDEABCDE' 'HIJFGHIJ' 'MNOKLMNO' 'RSTPQRST'

The random access preamble format 1 (e.g., see FIG. 6 and Table 1) of the legacy random access preamble may be represented as '111111' '111111' '111111' '111111', where '1' represents one symbol unit and also indicates that a modulation value of a single carrier is '1'. However, a symbol-level scrambled preamble format in the form of 'ABCDEA' 'FGHIJF' 'KLMNOK' 'PQRSTR' may be used to compensate for performance degradation in inter-cell interference environments or to enhance multiplexing capability. Here, the characters 'A', 'B', 'C' and the like represent arbitrary modulation values compared to '1', meaning that the same character has the same modulation value for reasons such as generation of a cyclic prefix.

For example, when symbols in a symbol group are configured like 'ABCDEA', the duration of the cyclic prefix may be limited to one symbol period, and thus a supportable cell radius may be limited to 40 km, similar to the legacy preamble. In contrast, in the enhanced preamble using E-CP, a structure of 'ABCABC' 'DEFDEF' 'GHIGHI' 'JKLJKL' may be used to introduce scrambling.

FIG. 9(a) shows an example of a preamble format according to Structure 1-2. The preamble format of FIG. 9A may be generated by applying a scrambling sequence at a symbol level. For example, as illustrated in FIG. 9(a), symbol group 0 may be generated by multiplying a scrambling sequence (A, B, C, A, B, C) at a symbol level. Similarly, symbol group 1 may be generated by multiplying a scrambling sequence (D, E, F, D, E, F) at the symbol level, symbol group 2 may be generated by multiplying a scrambling sequence (G, H, I, G, H, I) at the symbol level, and symbol group 3 may be generated by multiplying a scrambling sequence (J, K, L, J, K, L) at the symbol level (not shown). As the scrambling sequence, an orthogonal sequence, a random sequence, or a pseudo-random sequence may be used. Accordingly, the symbol group illustrated in FIG. 9(a) may have symbol values having a self correlation of zero. A different scrambling sequence may be used for each symbol group, or the same scrambling sequence may be used for the symbol groups.

In Structure 1-2, the CP overhead is 50% because three of the six symbols in the symbol group are used for cyclic prefix. As in Structure 1-1, the number of useful symbols in a symbol group may be increased in order to reduce the CP overhead. For example, when the number of symbols in a symbol group is 8, the structure may be 'CDEABCDE' 'HIJFGHIJ' 'MNOKLMNO' 'RSTPQRST'.

FIG. 9(b) shows another example of a preamble format according to Structure 1-2. The preamble format illustrated in FIG. 9(b) may have 8 symbols as in FIG. 8(b). In contrast to the preamble format of FIG. 8(b), the preamble format of FIG. 9(b) may be generated by applying a scrambling sequence at the symbol level. For example, as illustrated in FIG. 9(b), symbol group 0 may be generated by multiplying a scrambling sequence (C, D, E, A, B, C, D, E) at the symbol level. Similarly, symbol group 1 may be generated by multiplying a scrambling sequence (H, I, J, F, G, H, I, J) at the symbol level, symbol group 2 may be generated by multiplying a scrambling sequence (M, N, O, K, L, M, N, O) at the symbol level, and symbol group 3 may be generated by multiplying a scrambling sequence (R, S, T, P, Q, R, S, T) at the symbol level (not shown). As the scrambling sequence, an orthogonal sequence, a random sequence, or a pseudo-random sequence may be used. Accordingly, each symbol group illustrated in FIG. 9(b) may have symbol values having a self correlation of zero. A different scrambling sequence may be used for each symbol group, or the same scrambling sequence may be used for the symbol groups.

Enhanced Preamble Structure 1-3: 'AAAAAAAA' 'BBBBBBBB' 'CCCCCCCC' 'DDDDDDDD'

Structure 1-2 described above corresponds to a case where symbol-level scrambling is applied to the legacy preamble structure. When the symbol-level scrambling is applied, each symbol has a different modulation value, and therefore a peak-to-average power ratio (PAPR) is higher than that of the legacy preamble. Symbol group-level scrambling may be considered as a way to compromise increase in PAPR and the advantages of scrambling described above. When the symbol group-level scrambling is applied, the enhanced preamble may be represented in the form of 'AAAAAA' 'BBBBBB' 'CCCCCC' 'DDDDDD'. In this case, as in Structure 1-1, the number of symbols in the symbol group may be increased in consideration of the E-CP and the overhead. For example, when the number of symbols in the symbol group is increased to 8, a structure such as 'AAAAAAAA' 'BBBBBBBB' 'CCCCCCCC' 'DDDDDDDD' may be used.

Figure 10:
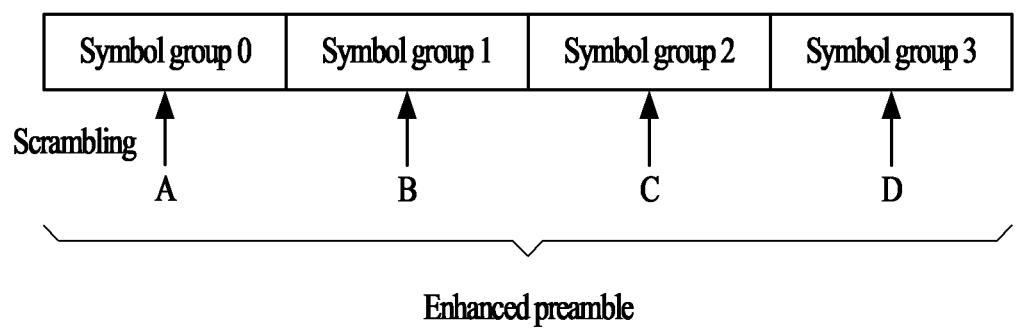

FIG. 10 illustrates an enhanced preamble according to Structure 1-3.

As illustrated in FIG. 10, an enhanced preamble according to Structures 1-3 may be generated by applying a scrambling sequence at a symbol group level. For example, as illustrated in FIG. 10, an enhanced preamble may be generated by multiplying each symbol group of the enhanced preamble by a scrambling sequence (A, B, C, D). In this case, each symbol group may have a preamble format illustrated in FIG. 8(a) or FIG. 8(b). Here, each symbol value of symbol group 0 may be A, each symbol value of symbol group 1 may be B, each symbol value of symbol group 2 may be C, and each symbol value of symbol group 3 may be D. As the scrambling sequence, an orthogonal sequence, a random sequence, or a pseudo-random sequence may be used.

Enhanced preamble structures 1-1, 1-2 and 1-3 all use the E-CP to increase the number of symbols in a symbol group to compensate for poor coverage and/or timing estimation performance per preamble resulting from increase of the CP overhead and decrease in the number of useful symbols in a symbol group. For example, in this design method, the preamble may be composed of 4 symbol groups as in the conventional cases, and each symbol group may be composed of 8 symbols such that the same number of useful symbols as in the conventional cases are provided while supporting the E-CP. In this case, since the number of useful symbols per preamble is 5 as in the conventional cases and the total number of symbols is 8. Accordingly, the coverage performance per preamble repetition number may be expected to be similar to or better than that of the legacy preamble. In addition, in timing estimation using a phase difference between the symbol groups, performance may be maintained or enhanced compared to the legacy preamble.

However, in enhanced preamble structures 1-1, 1-2 and 1-3, the length of the enhanced preamble is different from that of the legacy preamble, and accordingly it may not be possible or easy to efficiently use NPRACH time/frequency resources in a system where the legacy preamble and the enhanced preamble coexist. In the system where the legacy preamble and the enhanced preamble coexist, the NPRACH resource of the legacy preamble may be shared or the same NPRACH resource configuration as the legacy preamble may be used in transmitting the enhanced preamble to ensure efficient utilization of NPRACH time/frequency resources and/or backward compatibility. The NPRACH resource refers to a time and frequency resource used for NPRACH preamble transmission, and may be transmitted to the UE through a higher layer signal (e.g., an RRC layer signal) or system information (e.g., SIB2).

For example, as a method of sharing an NPRACH resource, the NPRACH resource may be used through FDM. More specifically, the NPRACH frequency resources may be identified to allocate some of the resources to the legacy preamble and the other resources to the enhanced preamble. For efficient utilization of NPRACH time/frequency resources and/or backward compatibility, the length of the enhanced preamble may be designed to be the same as the length of the legacy preamble. This operation is referred to as preamble boundary alignment of the legacy preamble and the enhanced preamble. The number of symbols per symbol group and/or the number of symbol groups per preamble may be adjusted for preamble boundary alignment. For the preamble boundary alignment, the number of symbols per symbol group may be adjusted to 9 or 12.

For example, in the case where the number of symbol groups per preamble is adjusted, if 8 symbols constitutes one symbol group, this may correspond to (Number of symbols per preamble)=(8 symbols/symbol group*4 symbol groups/preamble)=(32 symbols/preamble). In this case, the number of symbol groups constituting a preamble may be adjusted to 3, and therefore (Number of symbols per preamble)=(8 symbols/symbol group*3 symbol groups/preamble)=(24 symbols/preamble). In this case, the number of symbols is equal to the number of symbols constituting the legacy preamble, and therefore preamble boundary alignment may be performed between the legacy preamble and the enhanced preamble. All the above-mentioned methods are applied to enhanced preamble structures 1-1, 1-2, and 1-3.

NPRACH Range Enhancement Method 2: How to Reduce Subcarrier Spacing

As described above, a more fundamental method for supporting a 100 km cell radius without ambiguity in timing estimation is to narrow the subcarrier spacing of the random access preamble (or NPRACH preamble) to 1.5 kHz or less. For example, taking into account additional delay spread and even interference in FDM, 1.25 kHz, an integer submultiple of 3.75 kHz may be used the enhanced preamble subcarrier spacing. In this case, up to a 120 km cell radius may be supported. With small subcarrier spacing without ambiguity in timing estimation is used as described above, a processing operation for addressing the ambiguity of the base station required in the NPRACH range enhancement method 1 may be eliminated.

In addition, Method 2 may provide a large multiplexing capability in FDM due to the small subcarrier spacing compared to the conventional preamble. On the other hand, when the same repetition level is assumed due to an increase in symbol duration, the method may be disadvantageous in terms of delay or power, and may be relatively weak in Doppler performance. For example, when 1.25 kHz is used as the subcarrier spacing of the enhanced preamble, 36 enhanced preambles may be allocated and used as compared to the conventional case of FDM using 12 3.75 kHz subcarrier spacings. Assuming the same repetition, the length of the enhanced preamble is three times the length of the legacy preamble.

Since NPRACH range enhancement method 2 uses a smaller subcarrier spacing (e.g., 1.5 kHz or less), CP overhead is the same if the number of symbol groups constituting the preamble and the number of symbols per symbol group are the same as those of the legacy preamble. However, as in NPRACH range enhancement method 1, the number of symbols in the symbol group may be increased to further reduce the CP overhead. Alternatively, latency may be reduced compared to the legacy preamble at the same number of repetitions, the number of symbols in a symbol group (constituting the enhanced preamble) may be reduced to maintain the same latency as the legacy preamble or to share the NPRACH time resource (see Structure 2-1). In addition, in order to reduce the probability of false detection under inter-cell interference or to increase the multiplexing capability, a symbol-level scrambling sequence may be applied (see structure 2-2) or a symbol group-level scrambling sequence may be applied (see Structure 2-3). A simple example of each case is given below.

Enhanced Preamble Structure 2-1

Assuming the same structure as the legacy preamble (the number of symbol groups in the preamble and the number of symbols in a symbol group), the enhanced preamble may be represented as '111111' '111111' '111111' '111111' like the legacy preamble. The enhanced preamble according to Method 2 uses a smaller subcarrier spacing (e.g., 1.5 kHz or less) than the legacy preamble, which increases the length of the preamble in the time domain. Thus, in contrast to the legacy preamble, the enhanced preambles extends the length of absolute time (in the time domain) by the narrowed subcarrier spacing. In this case, the CP overhead is 16.7%, which is the same as in the legacy preamble. However, in order to configured the length of the symbol group to be the same as in the legacy preamble, a preamble in the form of '11' '11' '11' '11' may be considered.

Figure 11:
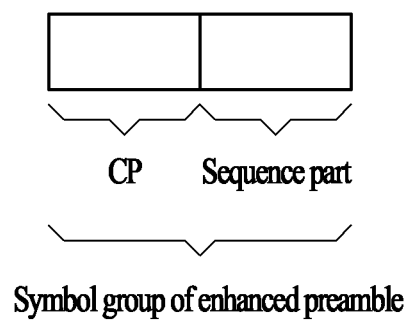

FIG. 11 illustrates a preamble format according to Structure 2-1. When 1/N times the subcarrier spacing of the legacy preamble is configured to be the subcarrier spacing of the enhanced preamble using Method 2 of the present disclosure (where N is an integer greater than 1), the symbol duration of the enhanced preamble may become N times the symbol duration of the legacy preamble, and the number of symbols of the enhanced preamble may be reduced to have the same length as the legacy preamble.

Referring to FIG. 11, it is assumed that 1.25 kHz, which is ⅓ times the subcarrier spacing of 3.75 kHz of the legacy preamble, is configured to be the subcarrier spacing of the enhanced preamble using Method 2 of the present disclosure. In this case, in order to configure the same length as the legacy preamble, the number of symbols in the sequence part may be reduced from 5 to 1, and the preamble format according to Structure 2-1 may include a CP part corresponding to one symbol and a sequence part corresponding to one symbol.

When the time length of a symbol group or the number of symbol groups in the preamble is the same as in the case of the legacy preamble, the NPRACH time resource may be shared with the legacy preamble because the time length of the preamble is the same as the legacy preamble. Therefore, when enhanced preamble structure 2-1 is applied, the NPRACH resource configuration of the enhanced preamble may be indicated using the resource configuration of the legacy preamble, which is advantageous in terms of resource configuration indication.

Enhanced Preamble Structure 2-2

Symbol-level scrambling may be introduced to reduce the probability of false detection under inter-cell interference or to increase the multiplexing capability. In this case, as in Structure 1-2 of NPRACH range enhancement method 1, the structure of 'ABCDEA' 'FGHIJF' 'KLMNOK' 'PQRSTR' may be used to have the same CP overhead. In addition, the number of symbols in a symbol group may be increased or decreased to adjust the CP overhead and latency.

FIG. 12 illustrates a preamble format according to structure 2-2. FIG. 12(a) exemplarily shows a preamble format given when a symbol group includes a CP part corresponding to one symbol and a sequence part corresponding to five symbols, similar to the legacy preamble, and FIG. 12(b) exemplarily shows a preamble format including a CP part corresponding to one symbol and a sequence part corresponding to one symbol according to Structure 2-1.

The preamble format of FIG. 12(*a*) may be generated by applying a scrambling sequence at a symbol level. For example, as illustrated in FIG. 12(*a*), symbol group 0 may be generated by multiplying a scrambling sequence (A, B, C, D, E, A) at the symbol level. Similarly, symbol group 1 may be generated by multiplying a scrambling sequence (F, G, H, I, J, F) at the symbol level, symbol group 2 may be generated by multiplying a scrambling sequence (K, L, M, N, O, K) at the symbol level, and symbol group 3 may be generated by multiplying a scrambling sequence (P, Q, R, S, T, R) at the symbol level (not shown).

Similarly, the preamble format of FIG. 12(*b*) may be generated by applying a scrambling sequence at the symbol level. In contrast to the example of FIG. 12(*a*), a short scrambling sequence may be applied. For example, as illustrated in FIG. 12(*b*), symbol group 0 may be generated by multiplying a scrambling sequence (A, B) at the symbol level. Similarly, symbol group 1 may be generated by multiplying a scrambling sequence (C, D) at the symbol level, symbol group 2 may be generated by multiplying a scrambling sequence (E, F) at the symbol level, and symbol group 3 may be generated by multiplying a scrambling sequence (G, H) at the symbol level (not shown).

In the examples of FIG. 12, an orthogonal sequence, a random sequence, a pseudo-random sequence may be used as the scrambling sequence. Accordingly, the symbol group illustrated in FIG. 12 may have symbol values having a self correlation of zero. A different scrambling sequence may be used for each symbol group, or the same scrambling sequence may be used for the symbol groups.

Enhanced Preamble Structure 2-3

When symbol group-level scrambling is introduced, the structure of 'AAAAAA' 'BBBBBB' 'CCCCCC' 'DDDDDD' may be used to have the same CP overhead as in Structure 1-3 of NPRACH range enhancement method 1. In addition, in order to adjust the CP overhead and latency, the number of symbols in a symbol group may be increased or reduced in the form of 'AA' 'BB' 'CC' 'DD' for NPRACH time resource sharing. For example, the description given in relation to FIG. 10 may be applied to the Enhanced preamble structure 2-3 in the same/similar manner.

Method 3: NPRACH Resource Configuration Method for NPRACH Range Enhancement

Resource configuration of the enhanced NPRACH is possible in time, frequency, and orthogonal sequence regions. For a cell supporting only enhanced NPRACH, the enhanced preamble may be transmitted according to the period of the enhanced preamble (or NPRACH preamble), the starting point in the period, the number of repetitions, and the starting subcarrier position and region (e.g., the number of subcarriers). When the number of repetitions is included in the NPRACH resource configuration, additional guard time information may be broadcast in consideration of the guard time for NPRACH range enhancement described in Method 4.

Accordingly, the resource configuration information for the enhanced preamble may include at least of information indicating a period of the NPRACH resource for the enhanced preamble, information indicating a starting time within one period, information indicating the number of times of repeated transmission of the enhanced preamble, information indicating the number of subcarriers constituting the NPRACH resource for the enhanced preamble, information indicating a starting subcarrier position of the enhanced preamble, or information indicating an additional guard time. The resource configuration information for the enhanced preamble may be transmitted to the UE through a higher layer signal (e.g., an RRC layer signal) or system information (e.g., System Information Block Type 2 (SIB2)).

In a cell supporting both the legacy UE and the enhanced UE, NPRACH resource configuration may be performed in the following manner.

NPRACH time/frequency resources may be allocated independently for the legacy UE and the enhanced UE. In this case, in order to prevent resource collision, the legacy UE needs to be informed of the enhanced NPRACH resource region, and the resource configuration of the enhanced NPRACH, which is newly added, may be limited to allow the legacy UE to identify the enhanced NPRACH resource region. For example, the NPRACH resources of the legacy UE are indicated by the period and starting point of the NPRACH and the number of repetitions of the preamble through a higher layer signal (e.g., an RRC layer signal). The NPRACH duration is determined by the number of repetitions supported by the legacy UE. Even for the enhanced preamble newly designed for efficient resource utilization of the legacy UE, the resource configuration may be limited to match the legacy NPRACH interval by limiting the repetition of the enhanced preamble according to the NPRACH resource interval supported by the legacy UE.

As mentioned above, when the E-CP is supported in the enhanced preamble, the number of useful symbols may be reduced, and thus performance may be degraded compared to the legacy preamble at the same number of repetitions (see the description of Method 1). To compensate for this, Method 1 proposes a preamble structure of increasing the number of symbols in a symbol group (see Structures 1-1, 1-2, and 1-3). Additionally/independently, the energy of useful symbols may be increased by increasing the number of repetitions of the enhanced preamble. In consideration of this, in order to maintain the coverage of the enhanced preamble at the same level as the legacy preamble, the number of repetitions may be added in the resource configuration of the enhanced preamble. For example, a resource configuration that has the number of repetitions twice or 4 times the maximum repetition level of the legacy preamble may be added, or the resources of the enhanced preamble may be configured to support the number of repetitions that may compensate for the reduced percentage of useful symbols.

Method 4: Configuring a Guard Time for NPRACH Range Enhancement

As mentioned above, a guard time (GT) corresponding to a distance twice the cell radius is needed to avoid overlapping of the random access preamble received from the UE with an immediately subsequent subframe adjacent thereto from the base station perspective (e.g., see Equation 7). As mentioned above, to support a cell radius of 100 km, a guard time of at least 666.7 us should be secured. Table 3 shows time gaps which are naturally produced as the time length of a random access preamble is not aligned with subframe boundaries at intervals of 1 ms. Since the length of the enhanced preamble is assumed to be 6.4 ms, which is the same as in conventional cases, the time gap naturally produced for the number of repetitions has one value among 200 us, 400 us, 600 us, and 800 us.

TABLE 3

| | Number of repetition | | | | | | | |
|---|---|---|---|---|---|---|---|---|
| | 1 | 2 | 4 | 8 | 16 | 32 | 64 | 128 |
| Preamble length (ms) | 6.4 | 12.8 | 25.6 | 51.2 | 102.4 | 204.8 | 409.6 | 819.2 |
| Time gap (ms) | 0.6 | 0.2 | 0.4 | 0.8 | 0.6 | 0.2 | 0.4 | 0.8 |

For the legacy preamble, a guard time of 266.7 us is required to support a cell radius of 40 km. Referring to Table 3 above, there are time gaps beyond the required guard time in all cases except the cases where the number of repetitions is 2 and 32. Even in the other cases, a time gap of 200 us is present, and therefore the guard time may not be needed in the legacy preamble. However, to enhance the NPRACH range, a guard time of 666.7 us or more may be required. Therefore, it is proposed that the enhanced preamble be designed in consideration of the guard time. In order to secure a guard time for NPRACH range enhancement, the following methods may be used.

Method 4-1: Adding a Guard Time after the Last Repetition of the Enhanced Preamble Regardless of the Number of Repetitions For example, a guard time corresponding to 666.7 us is added to the end of the random access preamble that is repeated as many times as necessary to support a cell radius of 100 km. In this case, the base station establishes the NPRACH resource configuration in consideration of the number of repetitions and guard time of the enhanced preamble, and broadcasts the corresponding information. The UE considers a value of the preamble length plus the required guard time (666.7 us) as the end of the enhanced preamble, and thus postpones or punctures uplink transmission and downlink reception until a subframe containing a point at which the enhanced preamble including the guard time ends. For simplicity, a subframe that needs to be additionally postponed or punctured due to the insufficient guard time is referred to as a "guard subframe."

Method 4-2: Selectively Adding a Guard Time after the Last Repetition of the Enhanced Preamble Depending on the Number of Repetitions Referring to Table 3, for the repetitions corresponding to 8 and 128, since there is a time gap (800 us) longer than the required guard time (e.g., 666.7 us), an additional guard time is unnecessary and a guard subframe may not be needed. However, for the number of repetitions corresponding to 1, 2, 4, 16, 32, and 64, since the time gap is smaller than the required guard time (e.g., 666.7 us), an additional guard time may be needed and thus a guard subframe may be needed. When the need for the guard subframe depends on a specific number of repetitions as described above, the base station may establish an NPRACH resource configuration without considering the guard time as in the conventional cases, and then broadcast additional indication information (e.g., a 1-bit flag) to inform the UE of the case where a guard subframe is needed. The indication information (e.g., 1-bit flag) may indicate whether "the next subframe after the subframe in which the last repetition of the preamble ends is allocated as an NPRACH resource or a guard subframe to secure a guard time".

The UE postpones or punctures uplink transmission and/or downlink reception only until the subframe containing a point at which the repetition of the enhanced preamble ends, depending on a value of the indication information (e.g., 1-bit flag) indicating whether a guard subframe is present. In addition, it postpones or punctures until the next subframe after the subframe containing the point at which the repetition of the enhanced preamble ends. For example, when the value of the indication information is 1, it may indicate that the next subframe after the subframe containing the point at which the last repetition of the preamble ends is configured as an NPRACH resource or a guard subframe, and the UE may postpone or puncture uplink transmission in the corresponding subframe. On the other hand, when the value of the indication information is 0, it may indicate that the next subframe after the subframe containing the point at which the last repetition of the preamble ends is not configured as an NPRACH resource or a guard subframe, and the UE may neither postpone nor puncture uplink transmission in the corresponding subframe. The values of the indication information are merely an example, and the values of the indication information may be configured to have opposite meanings.

Alternatively, in order to reduce signaling overhead, the indication information (e.g., 1-bit flag) may not be signaled, and it may be pre-specified that the presence or absence of a guard subframe is determined based on the length of the enhanced preamble including the guard time to postpone or puncture uplink transmission and downlink reception.

The indication information (e.g., 1 bit flag) may be transmitted as one of values indicating states generated by a plurality of bits such that the indication information is transmitted together with other information. Further, the indication information may be broadcast (through specific system information (or SIB)) or transmitted to the UE through common DCI, group-common DCI, or UE-specific DCI. Alternatively, the indication information may be transmitted to the UE through resource configuration information for the enhanced preamble (see Method 3).

Method 4-3: Limiting the Number of Repetitions of the Enhanced Preamble to Ensure that the Time Gap According to the Number of Repetitions is Larger than the Guard Time and Thus No Separate Guard Time is Needed Given that the time gap varies with the number of repetitions and thus the need for guard time varies, proposed are methods of configuring the exact number of repetitions to the most approximate number of repetitions having a time gap larger than or equal to the minimum allowable time gap while supporting repetition at a similar level to the conventional NPRACH.

FIG. 13 illustrates the number of repetitions and the time gap configured according to Method 4-3.

The minimum allowable time gap may be configured to be a guard time (e.g., 666.7 us) required to support a cell radius of 100 km and the number of repetitions supporting a time gap larger than or equal to the minimum allowable time gap may be configured (this method will be referee as Method 4-3-1). FIG. 13(a) shows the number of repetitions according to Method 4-3-1 and a corresponding time gap. In contrast to Table 3, the numbers of repetitions presented in the shaded portion and the corresponding time gaps are configured differently. For all numbers of repetitions except for the case where the number of repetitions is 1, there is a time gap of 800 us, and therefore it may be seen that there is no need for any separate guard time configuration or related signaling.

Alternatively, in order to support the number of repetitions as close to the conventional ones as possible To ensure coverage performance similar to the conventional coverage performance, the minimum allowable time gap may be configured to be 600 us, and numbers of repetitions supporting time gaps larger than the minimum allowable time gap may be configured (Method 4-3-2). FIG. 13(b) shows numbers of repetitions according to Method 4-3-2 and corresponding time gaps.

As in Method 4-3-1 and Method 4-3-2, numbers of repetitions may be predefined such that only the numbers of repetitions having a time gap that requires no guard time are supported. In this case, the UE postpones or punctures uplink transmission and downlink reception based on a predefined number of repetitions, without considering an additional guard time or guard subframe.

Method 4-4: Puncturing or Dropping the Last Repetition of the Enhanced Preamble if No Guard Time is Secured for a Corresponding Number of Repetitions Methods 4-1, 4-2, and 4-3 may raise an issue regarding backward compatibility when a legacy UE supporting only the legacy preamble and an enhanced UE coexist. Since the legacy UE supporting only the legacy preamble does not know whether Methods 4-1, 4-2, and 4-3 are applied, the legacy UE may not know presence of the guard time after the broadcast NPRACH resource, and thus may not perform an operation such as postponing or puncturing. The UE operating according to the enhanced preamble may not secure a guard time, and thus a collision may occur between the last repetition of the enhanced preamble and the UL or DL data of the next subframe. To address this issue, the last repetition of the enhanced preamble may be dropped or be punctured as to secure a guard time.

Method 4-4 is to allow the same number of repetitions as in the legacy UE while dropping the last repetition of the enhanced preamble or puncturing the same by a required guard time when the UE transmitting the enhanced preamble does not secure the required guard time. In Method 4-4, the same number of repetitions as in the legacy UE may be allowed, and one of the allowed numbers of repetitions is configured, and configuration information indicating the configured number is broadcast to the UE. When puncturing is performed, the last part of the last repetition of the enhanced preamble is punctured by at least (guard time–time gap), taking into account the required guard time and the naturally produced time gap.

If the repetitions are sufficient, puncturing or dropping the last repetition may make no difference in preamble transmission performance. However, if the number of repetitions is small, the preamble transmission performance may be affected. For example, if Number of repetitions={1, 2, 4}, that is, if the number of repetitions is one of 1, 2, or 4, when the last repetition is punctured or dropped, the symbol energy of the preamble may not be sufficiently accumulated, and thus the probability of occurrence of a transmission error may increase. 8 also corresponds to a small number of repetitions. However, when 8 is applied as the number of repetitions, the last repetition is neither dropped nor punctured because the naturally produced time gap is larger than the guard time. In order to address the issue raised when the number of repetitions is small as described above, the next higher repetition level (or number of times) of the originally configured number of repetitions may be indicated and configured to the UE, and the UE may apply Method 4-4 to the configured repetition level (or number of times) to drop or transmit the last repetition of the enhanced preamble.

For example, referring to Table 3, when the number of repetitions is determined to be 1, 2 may be configured to be the next higher repetition number for the UE, and the UE may apply Method 4-4 to drop the second repetition or puncture a portion of 200 us corresponding to the next subframe in the second repetition. As another example, referring to Table 3, when the number of repetitions is determined to be 2, 4 may be configured to be the next higher repetition number for the UE, and the UE may apply Method 4-4 to drop the fourth repetition or puncture a portion of 400 us corresponding to the next subframe in the fourth repetition. As another example, referring to Table 3, when the number of repetitions is determined to be 4, 8 may be configured to be the next higher repetition number for the UE, and the last repeated transmission is not dropped/punctured because the time gap to the next subframe when repetition is performed 8 times is larger than the required guard time.

Figure 14:
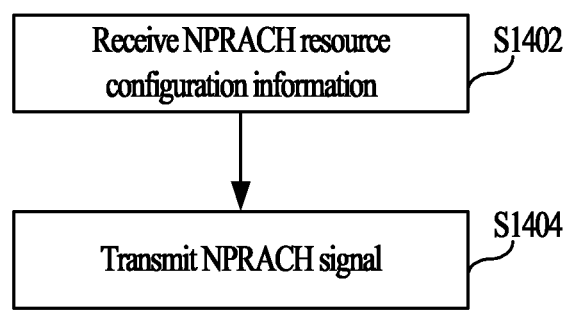
FIG. 14 illustrates a random access procedure according to the present disclosure.

FIG. 14 illustrates a random access procedure according to the present disclosure. Although the method of FIG. 14 is described form the UE perspective, an operation corresponding to the operation of the UE may be performed by the base station.

In step S1402, the UE may receive NPRACH configuration information. The NPRACH configuration information may be received through a higher layer signal (e.g., an RRC layer signal) or system information (e.g., SIB2). The NPRACH configuration information may include information proposed in Method 3 of the present disclosure. The UE may configure an NPRACH resource based on the received NPRACH configuration information as described in Method 3. Alternatively, in step S1402, the NPRACH configuration information may be configured in the same manner as that for the legacy UE.

In step S1404, the UE may generate and transmit an NPRACH preamble or signal based on the received NPRACH configuration information. In step S1402, Methods 1, 2, and 4 of the present disclosure may be applied independently or in combination.

As an example, the NPRACH preamble or signal may be generated according to Method 1 of the present disclosure and may have a preamble format according to Structure 1-1, Structure 1-2, or Structure 1-3 (e.g., see FIGS. 8 to 10 and related descriptions). As another example, the NPRACH preamble or signal may be generated according to Method 2 of the present disclosure and may have a preamble format according to Structure 2-1, Structure 2-2, or Structure 2-3 (e.g., see FIGS. 10 to 12 and related descriptions).

Additionally or independently, a guard time may be applied to the transmission of the NPRACH preamble or signal to enhance the NPRACH range, and the guard time may be applied based on at least one of Methods 4-1 to 4-4 of the present disclosure.

In Method 4-4 of the present disclosure, it has been proposed that the last repetition of the enhanced preamble be dropped or punctured in order to secure a guard time. The same principle as proposed in Method 4-4 may be applied even when trapping or a puncturing is performed on a symbol basis or a symbol group basis. When Method 4-4 is applied on a symbol basis, the minimum number of dropped or punctured symbols may be determined so as to be greater than or equal to (guard time–time gap). When Method 4-4 is applied on a symbol group basis, the minimum number of dropped or punctured symbol groups may be determined so as to be greater than or equal to (guard time–time gap).

The methods described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in the methods of the present disclosure may be rearranged. Some constructions of any one method may be included in another method and may be replaced with corresponding constructions of another method. It is obvious to those skilled in the art that claims that are not explicitly cited in each other in the appended claims may be presented in combination as an embodiment of the present disclosure or included as a new claim by a subsequent amendment after the application is filed.

Figure 15:
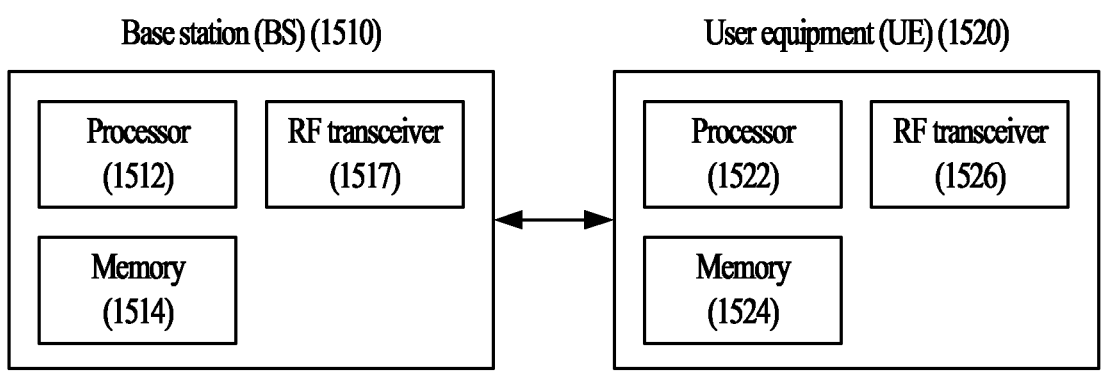
FIG. 15 illustrates a base station and a user equipment to which the present disclosure is applicable.

FIG. 15 illustrates a base station and a user equipment to which the present disclosure is applicable.

Referring to FIG. 15, a wireless communication system includes the base station (BS, 1210) and the user equipment (UE, 1220). When the wireless communication system includes a relay, the base station or the user equipment may be replaced with the relay.

The base station 1510 includes a processor 1512, a memory 1514, and a radio frequency (RF) transceiver 1516. The processor 1512 may be configured to embody the procedures and/or methods proposed by the present disclosure. The memory 1514 is connected to the processor 1512 and stores various pieces of information associated with an operation of the processor 1512. The RF transceiver 1516 is connected to the processor 1512 and transmits/receives a radio signal. The UE 1520 includes a process 1522, a memory 1524, and an RF transceiver 1526. The processor 1522 may be configured to embody the procedures and/or methods proposed by the present disclosure. The memory 1524 is connected to the processor 1522 and stores various pieces of information associated with an operation of the processor 1522. The RF transceiver 1526 is connected to the processor 1522 and transmits/receives a radio signal.

The embodiments of the present disclosure may be implemented by various means, for example, hardware, firmware, software, or a combination thereof. In a hardware implementation, an embodiment of the present disclosure may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, methods according to the present disclosure may be implemented in the form of a module, a procedure, a function, etc which are configured to perform the functions or operations as described in the present specification. Software code may be stored in a computer-readable medium in the form of instructions and/or data and may be executed by a processor. The computer-readable medium is located at the interior or exterior of the processor and may transmit and receive data to and from the processor via various known means.

It will be apparent to those skilled in the art that various modifications and variations can be made in the present disclosure without departing from the scope of the invention. Thus, it is intended that the present disclosure cover the modifications and variations of this invention provided they come within the scope of the appended claims and their equivalents.

INDUSTRIAL APPLICABILITY

The present disclosure is applicable to a wireless communication apparatus such as a user equipment (UE), a base station (BS), etc.

The invention claimed is:

1. A method for performing a random access procedure by a user equipment in a wireless communication system, the method comprising:

receiving narrowband physical random access channel (NPRACH) configuration information from a base station; and repeatedly transmitting an NPRACH preamble based on the received NPRACH configuration information, wherein, when a time gap between a time of completing a last repeated transmission of the NPRACH preamble and a next subframe is smaller than a guard time, the last repeated transmission of the NPRACH preamble is dropped or is punctured by a difference between the guard time and the time gap in the last repeated transmission of the NPRACH preamble.

2. The method of claim 1, wherein the guard time is configured through the NPRACH configuration information.

3. The method of claim 1, wherein a number of repeated transmissions of the NPRACH preamble is configured through the NPRACH configuration information.

4. The method of claim 3, wherein the number of repeated transmissions is configured to be one of 1, 2, 4, 8, 16, 32, 64, or 128, and wherein, when the number of repeated transmissions is one of 1, 2, or 4, the number of repeated transmissions of the NPRACH preamble is configured to be a next higher number of repeated transmissions.

5. The method of claim 1, wherein the NPRACH preamble comprises four symbol groups, and each of the four symbol groups comprises a cyclic prefix part corresponding to three symbols and a sequence part corresponding to three symbols.

6. The method of claim 5, wherein symbol-level scrambling is applied to each of the four symbol groups.

7. The method of claim 5, wherein symbol group-level scrambling is applied to the four symbol groups.

8. The method of claim 1, wherein the NPRACH preamble comprises four symbol groups, and each of the four symbol groups comprises a cyclic prefix part having a three-symbol duration and a sequence part having a five-symbol duration.

9. The method of claim 8, wherein symbol-level scrambling is applied to each of the four symbol groups.

10. The method of claim 8, wherein symbol group-level scrambling is applied to the four symbol groups.

11. The method of claim 1, wherein a subcarrier spacing for the NPRACH preamble is configured to be less than or equal to 1.5 kilohertz (kHz).

12. The method of claim 11, wherein the NPRACH preamble comprises four symbol groups, and each of the four symbol groups comprises a cyclic prefix part corresponding to one symbol and a sequence part corresponding to one symbol.

13. The method of claim 1, further comprising:

receiving information indicating whether the guard time is applied to the last repeated transmission of the NPRACH preamble, wherein, when the information indicates that the guard time is not applied to the last repeated transmission of the NPRACH preamble and the time gap is smaller than the guard time, the last repeated transmission of the NPRACH preamble is neither dropped nor punctured.

14. The method of claim 13, wherein, when the information indicates that the guard time is applied to the last repeated transmission of the NPRACH preamble and the time gap is smaller than the guard time, the last repeated transmission of the NPRACH preamble is dropped or is punctured by the difference between the guard time and the time gap.

15. A user equipment for performing a random access procedure in a wireless communication system, comprising:
- a radio frequency (RF) transceiver; and
- a processor operatively connected to the RF transceiver, wherein the processor is configured to:
- receive narrowband physical random access channel (NPRACH) configuration information from a base station, and
- repeatedly transmit an NPRACH preamble based on the received NPRACH configuration information,
- wherein, when a time gap between a time of completing a last repeated transmission of the NPRACH preamble and a next subframe is smaller than a guard time, the last repeated transmission of the NPRACH preamble is dropped or is punctured by a difference between the guard time and the time gap in the last repeated transmission of the NPRACH preamble.

* * * * *